US005487069A

United States Patent [19]
O'Sullivan et al.

[11] Patent Number: 5,487,069
[45] Date of Patent: Jan. 23, 1996

[54] WIRELESS LAN

[75] Inventors: John D. O'Sullivan, Ermington;
Graham R. Daniels, Willoughby;
Terence M. P. Percival, Lane Cove;
Diethelm I. Ostry, Petersham; John F. Deane, Eastwood, all of Australia

[73] Assignee: Commonwealth Scientific and Industrial Research Organisation, Australia

[21] Appl. No.: 157,375

[22] Filed: Nov. 23, 1993

[30] Foreign Application Priority Data

Nov. 27, 1992 [AU] Australia ............................... PL6069

[51] Int. Cl.$^6$ ................................................. H04B 7/01
[52] U.S. Cl. ......................... 370/94.3; 375/284; 375/348; 455/52.3; 455/65
[58] Field of Search ................................... 375/34, 39, 51, 375/57, 58, 99, 101, 254, 261, 279, 284, 285, 346, 348; 370/95.3; 455/56.1, 54.1, 63, 65, 52.3

[56] References Cited

U.S. PATENT DOCUMENTS

| | | | |
|---|---|---|---|
| 3,605,019 | 9/1971 | Cutter et al. ............................... | 375/58 |
| 4,630,314 | 12/1986 | Smith ....................................... | 375/58 |
| 4,679,227 | 7/1987 | Hartogs ..................................... | 375/58 |
| 4,888,767 | 12/1989 | Furuya et al. ............................. | 375/58 |
| 5,095,535 | 3/1992 | Freeburg ................................... | 455/55 |
| 5,191,576 | 3/1993 | Pommier et al. ......................... | 370/50 |
| 5,283,780 | 2/1994 | Schuchman et al. ..................... | 455/65 |

OTHER PUBLICATIONS

Supercomm/ICC'92 vol. 2, Jun. 1992, Chicago US pp. 1025-1031 D. Buchholz et al. 'Wireless In-Building Network Architecture and Protocols' p. 1029, left col., line 26-line 35.

IEEE Transactions on Communications, vol. 39, No. 5, May 1991, New York US pp. 783-793 E. F. Casas et al. 'OFDM for Data Communication over Mobile Radio FM Channels—Part I: Analysis and Experimental Results' p. 784, left col., line 1—right col., line 2; FIG. 1 p. 790, right col., line 18–line 22.

42nd VTS Conference vol. 2, May 1992, Denver US pp. 819–822 T. Le-Ngoc 'A CSMA/CD Portable Data System Using Adaptive Reed–Solomon Coding' p. 820, left col., line 2–line 9.

IEEE Transactions on Communications, vol. 33, No. 7, Jul. 1985, New York US pp. 665–675 L. J. Cimini Jr. 'Analysis and Simulation of a Digital Mobile Channel Using Orthogonal Frequency Division Multiplexing' par. I–par. II. Par IV.

*Primary Examiner*—Benedict V. Safourek
*Attorney, Agent, or Firm*—William S. Frommer

[57] ABSTRACT

The present invention discloses a wireless LAN, a peer-to-peer wireless LAN, a wireless transceiver and a method of transmitting data, all of which are capable of operating at frequencies in excess of 10 GHz and in multipath transmission environments. This is achieved by a combination of techniques which enable adequate performance in the presence of multipath transmission paths where the reciprocal of the information bit rate of the transmission is short relative to the time delay differences between significant ones of the multipath transmission paths. In the LANs the mobile transceivers are each connected to, and powered by, a corresponding portable electronic device with computational ability.

72 Claims, 8 Drawing Sheets

WIRELESS LAN

BACKGROUND OF THE INVENTION

The present invention relates to local area networks (LANs) which enable devices with computational ability to communicate with each other and, in particular, to a wireless LAN in which the devices communicate by means of radio transmissions.

In recent years the personal computer has become an increasingly important tool in business and commerce and many workers now spend a good portion of their working day operating such computers. Similarly, business organisations are increasingly structuring their businesses to not only enable, but to oblige, their workers to access information by means of a personal computer or equivalent terminal, which is connected to a local area network which extends around or through the office environment.

Hitherto such local area networks have been provided either by electrical conductor or optical fibre and this requires the office premises to be extensively cabled. This cabling must be adjusted if, for example, partitions within an office are to be adjusted. In addition, the cabling required for a classroom or tutorial arrangement where a large number of personal computers are intended to be operated within a small areas, can be quite substantial.

Furthermore, an increasing trend in recent times has been the sale of mobile or portable devices with computational ability. These include both laptop/notebook and handheld computers. Whilst the primary impetus for the purchase of such a computer is the ability to use its computational power outside of the normal office environment, once a portable computer has been purchased, the desire arises to use the portability within the office premises so as to allow the user of the portable computer to take the computer with him and use it in the closely adjacent offices of colleagues, for example, and yet still be able to access the LAN of the business organisation, which may be spread over several adjacent buildings in "campus" style.

While this is possible by means of plug-in connectors which enable the portable computer of one operator to be plugged into the office LAN at any particular location, it is generally inconvenient since the LAN may not provide for two or more points of connection within a single office, the portable computer loses its portability, and so on.

Accordingly, the need arises for a LAN to which such portable devices can be connected by means of a wireless or radio link.

Such wireless LANs are known, however, hitherto they have been substantially restricted to low data transmission rates. In order to achieve widespread commercial acceptability, it is necessary to have a relatively high transmission rate and therefore transmit on a relatively high frequency, of the order of 1 GHz or higher. As will be explained hereafter, radio transmission at such high frequencies encounters a collection of unique problems.

One wireless LAN which is commercially available is that sold by Motorola under the trade name ALTAIR. This system operates at approximately 18 GHz, however, the maximum data transmission rate is limited to approximately 3–6 Mbit/s. A useful review of this system and the problems of wireless reception at these frequencies and in "office" environments is contained in "Radio Propagation and Anti-multipath Techniques in the WIN Environment", James E. Mitzlaff IEEE Network Magazine November 1991 pp. 21–26.

This engineering designer concludes that the inadequate performance, and the large size, expense and power consumption of the hardware needed to adaptively equalize even a 10 Mbit/s data signal are such that the problems of multipath propagation cannot thereby be overcome in Wireless In-Building Network (WIN) systems. Similarly, spread spectrum techniques which might also be used to combat multipath problems consume too much bandwidth (300 MHz for 10 Mbits/s) to be effective. A data rate of 100 Mbit/s utilizing this technology would therefore consume 3 GHz of bandwidth.

Instead, the solution adopted by Motorola and Mitzlaff is a directional antenna system with 6 beams for each antenna resulting in 36 possible transmission paths to be periodically checked by the system processor in order to locate the "best quality" path and "switch" the antennae accordingly. This procedure adds substantial bulk and cost to the system. This procedure is essentially the conversion of a multipath transmission problem into a single path transmission environment by the use of directional antennae.

OBJECTS AND SUMMARY OF THE INVENTION

The object of the present invention is to provide a wireless LAN in a confined multipath transmission environment having a high bit rate even through the reciprocal of the data or information bit rate (the data "period") is short relative to the time delay differences between significant transmission paths.

According to one aspect of the invention there is disclosed a transmitter for operation in a confined multipath transmission environment, said transmitter comprising antenna means coupled to transmission signal processing means in turn coupled to an input data channel, said transmitter being operable to transmit data at radio frequencies in excess of 10 GHz, and said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths.

According to another aspect, there is disclosed a transmitter for operation in a confined multipath transmission environment, said transmitter comprising antenna means coupled to transmission signal processing means in turn coupled to an input data channel, said transmitter being operable to transmit data at radio frequencies, said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths, means to apply data reliability enhancement to said data passed to said modulation means and means, interposed between said data reliability enhancement means and said modulation means, for interleaving blocks of said data.

A transmitter can further be incorporated into a transceiver for operation in a confined multipath transmission environment. The transceiver also comprises reception signal processing means coupled to the antenna means and an output data channel to receive data at radio frequencies. A transceiver can be incorporated in a peer-to-peer wireless LAN, in that a plurality of mobile such transceivers for data transceiving operation by radio transmissions between ones thereof in a confined multipath environment. Furthermore, transceivers can be included in a wireless LAN, in that a plurality of such mobile transceivers have data transceiving operation by radio transmissions to one of a plurality of hub transceivers, the hub transceivers being coupled together to constitute a plurality of data sources and destinations.

According to another aspect, the invention discloses a method for transmitting data in a confined multipath transmission environment at radio frequencies in excess of 10 GHz, said data being provided by an input data channel coupled to transmission signal processing means in turn coupled to antenna means, said method comprising the steps of:

modulating said data, by modulation means of said transmission signal processing means, into a plurality of sub-channels comprised of a sequence of data symbols such that the period of a sub-channel symbol is longer than a predetermined period representative of the time delay of significant one of non-direct transmission paths; and transmitting, by said antenna means, said sub-channel symbols at said radio frequencies in excess of 10 GHz.

According to a yet further aspect of the invention, there is disclosed a method for transmitting data in a confined multipath transmission environment of radio frequencies, said data being provided by an input data channel coupled to transmission signal processing means in turn coupled to antenna means, said method comprising the steps of:

applying data reliability enhancement to said data;

interleaving blocks of said enhanced data;

modulating said data, by modulation means of said transmission signal processing means, into a plurality of sub-channels comprised of a sequence of data symbols such that the period of a sub-channel symbol is longer than a predetermined period representative of significant ones of non-direct transmission paths; and transmitting, by said antenna means, said sub-channel symbols.

Preferably, transmission is enhanced by the use of one or more of the following techniques, namely interactive channel sounding, forward error correction with redundancy sufficient for non-interactive correction, modulation with redundancy sufficient for interactive error correction by re-transmission of at least selected data, and the choice of allocation of data between sub-channels.

The radio transmission is also preferably divided into small packets of data each of which is transmitted over a time period in which the transmission characteristics over the predetermined range are relatively constant.

The encoding of the data is preferably carried out on an ensemble of carriers each costituting a sub-channel and having a different frequency with the modulation of each individual carrier preferably being multi-level modulation of carrier amplitude and/or phase (mQAM). The modulation family mQAM includes amplitude shift keying (ASK), multi-level ASK (mASK), permutation modulation, binary phase shift keying (BPSK), multi-level phase shift keying (mPSK), amplitude phase keying (APK), multi-level APK (mAPK) and the like.

DESCRIPTION OF THE PREFERRED EMBODIMENTS

Embodiments of the present invention will now be described with reference to the drawings.

Figure 1:
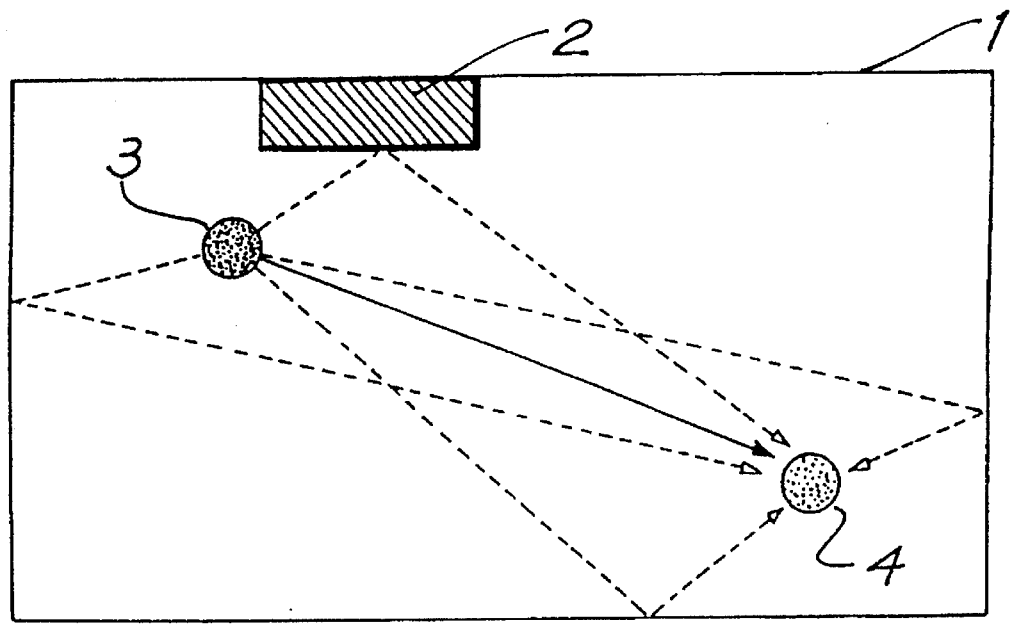
FIG. 1 is a schematic plan view of an office illustrating multipath transmissions of radio frequencies of at least 10 GHz caused by reflections.

In schematic form, FIG. 1 illustrates a room 1 in a typical office environment which includes items of furniture 2 and a transmitter 3 and receiver 4. For radio transmissions at a frequency in excess of 10 GHz, a multipath mode of transmission from the transmitter 3 to the receiver 4 occurs. Reflections from the walls (and floor and ceiling) of the room 1, items of furniture 2, and the like, within the room 1 cause the multiple path transmissions.

Figure 2:
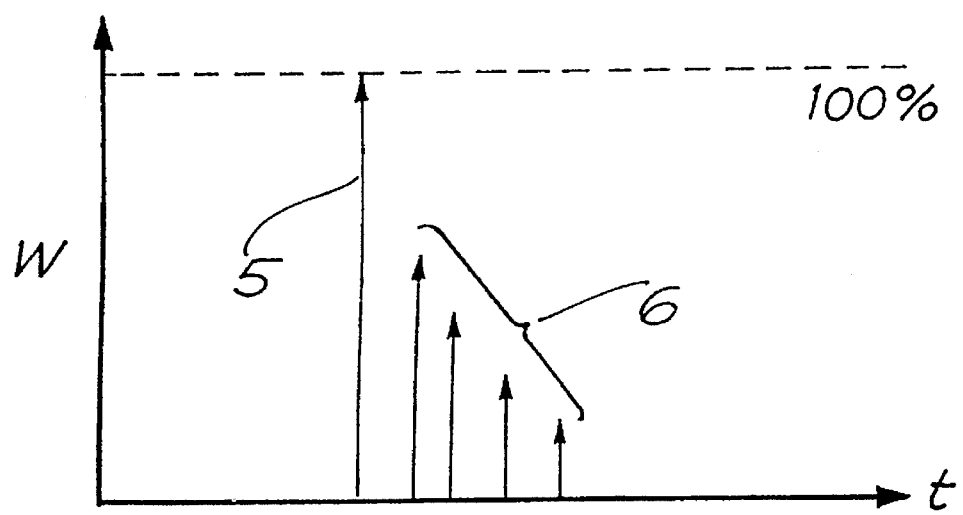
FIG. 2 is a graph of received power as a function of time, for an impulse transmission, illustrating the received signals of reduced magnitude which are delayed owing to the possibility of multiple path transmission.

As illustrated in FIG. 2, the effect of the multiple path transmissions is that the receiver 4 receives an undelayed signal 5 which has travelled directly from the transmitter 3 to the receiver 4, and a number of delayed signals 6 which are received at a time after receipt of the undelayed signal 5. The magnitude of the delayed signals 6 is usually somewhat attenuated. Under some conditions, the magnitude of the undelayed signal 5 can be attenuated also, sometimes by more than some delayed signals 6.

As a consequence of the delayed signals 6, it is necessary for the length of time during which a single symbol is transmitted (the symbol period) to be substantially longer than the delay time in order that the received echoes of a first symbol not mask the receipt of a subsequent symbol. This requirement has provided a severe upper limit to the rate at which data can be transmitted in such an environment.

Figure 3:
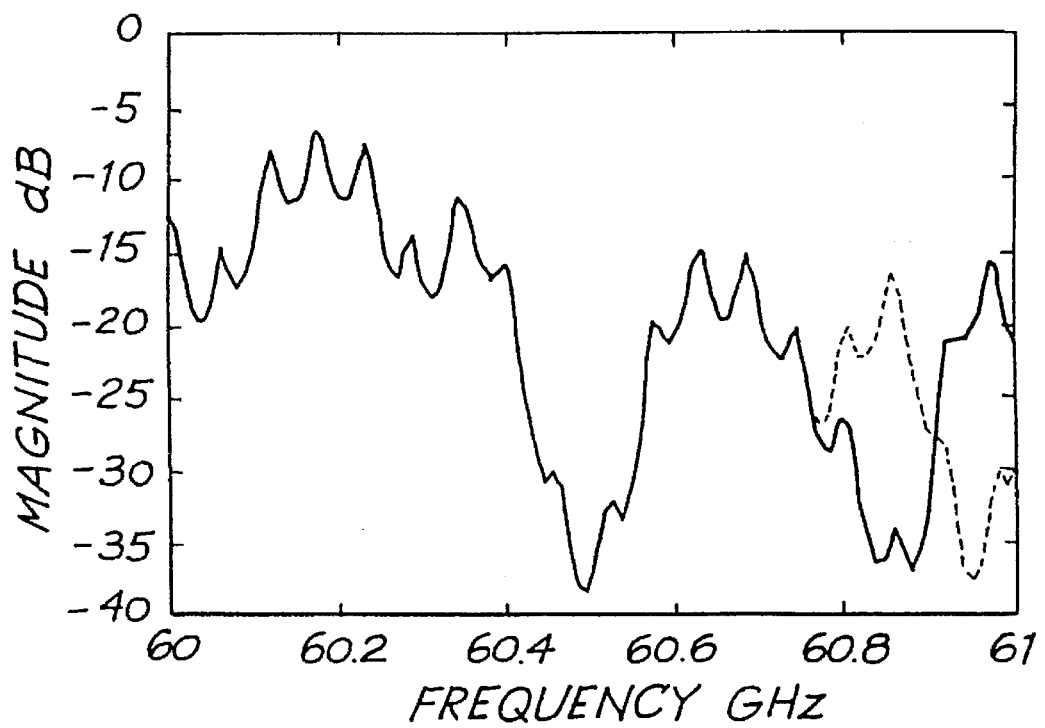
FIG. 3 is a graph of the received amplitude of steady state signals as a function of the transmitted frequency, this characteristic itself being time dependent.

Furthermore, as illustrated in FIG. 3, the office environment is by no means a good one for radio transmission. FIG. 3 illustrates a typical channel characteristic over a short time period illustrating the magnitude of the received signal as a function of frequency in the 1 GHz band between 60 and 51 GHz. It will be seen that the received amplitude is by no means constant and, in particular, at various frequencies fading occurs. Furthermore, as indicated by dotted lines in FIG. 3, the frequency at which fading occurs varies as a function of time because of movements within the room.

Such a communication channel is called a time varying frequency selective fading channel.

Similar, but different, communications channels are known in both telephone and long distance radio communications and various strategems, generally known as equalisation, are used to overcome the problems such channels present. However, in these fields since such fading is due to changes in temperature, or atmospheric conditions, once such telephone or long distance radio communication channels are established, the fading characteristic changes relatively slowly. Also in telephone applications advantage of the fact that channel degradation is generally low near the centre of the channel, can be taken when arranging the equalisation. This is not the case in an office or indoor environment.

Rather, in the above described office environment, the change in the transmission characteristic indicated by dotted lines in FIG. 3 can, for example, be caused by the simple act of someone opening a briefcase positioned on a desk. The raised lid of the briefcase results in a change in the characteristic. Similar extremely short term changes can be caused by the receiver 4 itself moving, or other objects moving such as doors opening, people moving, and the like. Clearly the transmitter 3 can also move. The foregoing establishes a very hostile environment within which the desired radio transmissions are to take place. In particular, there is no preferred channel or even a guaranteed channel within the 1 GHz band.

It would be possible to overcome the abovementioned difficulties by the use of highly directional antennae so as to eliminate all paths of transmission but the direct path. However, attempting to mechanically align such an antenna which was in turn affixed to a portable computer is commercially unattractive.

Figure 4:
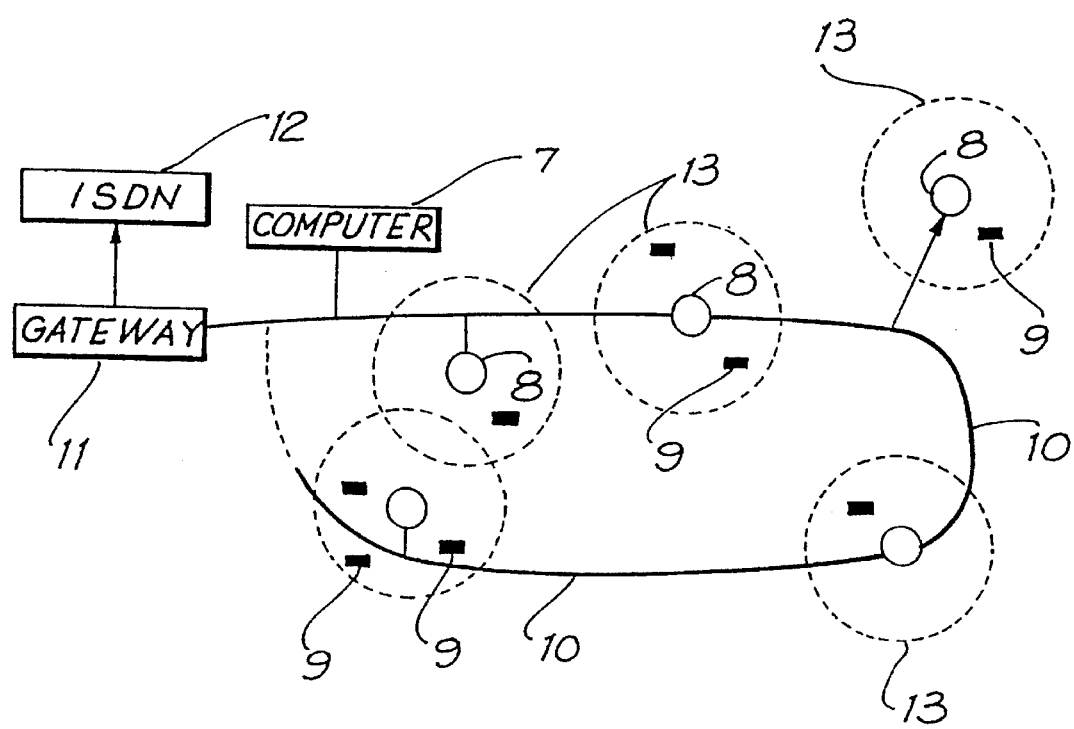
FIG. 4 is a schematic diagram illustrating a local area network including a plurality of hubs each of which is able to communicate with mobile transceiver(s) within a corresponding cell.

FIG. 4 illustrates in schematic form the general layout of a wireless LAN in accordance with a preferred embodiment of the present invention. A plurality of hubs 8 and mobile transceivers 9 are provided. The hubs 8 are interconnected by means of a backbone 10 which can take the form of either electrical conductors or optical fibre cable. As indicated by a dotted line in FIG. 4 the backbone 10 can constitute a loop. If desired, the backbone 10 can be connected to other computers 7 and, if desired, via a gateway 11 to the public switched telephone network 12. In a typical arrangement, each office (or each office in each building of a campus) would be provided with a single hub 8 which would communicate with the, or each of the, mobile transceivers 9 in that room. Either the backbone 10 can extend over the entire area to be covered, or the area can be covered by the use of multiple gateways and multiple backbones. The effective range of the transceiver within the hub 8 is arranged to essentially cover only that room. The limited transmission range for the hub 8 creates a corresponding cell 13 as indicated by broken lines in FIG. 4. For a large room such as a lecture room in an educational institution, the length of the room can require that the room be provided with two hubs 8 in which case two partially overlapping cells 13 would be present within the one room.

Figure 5:
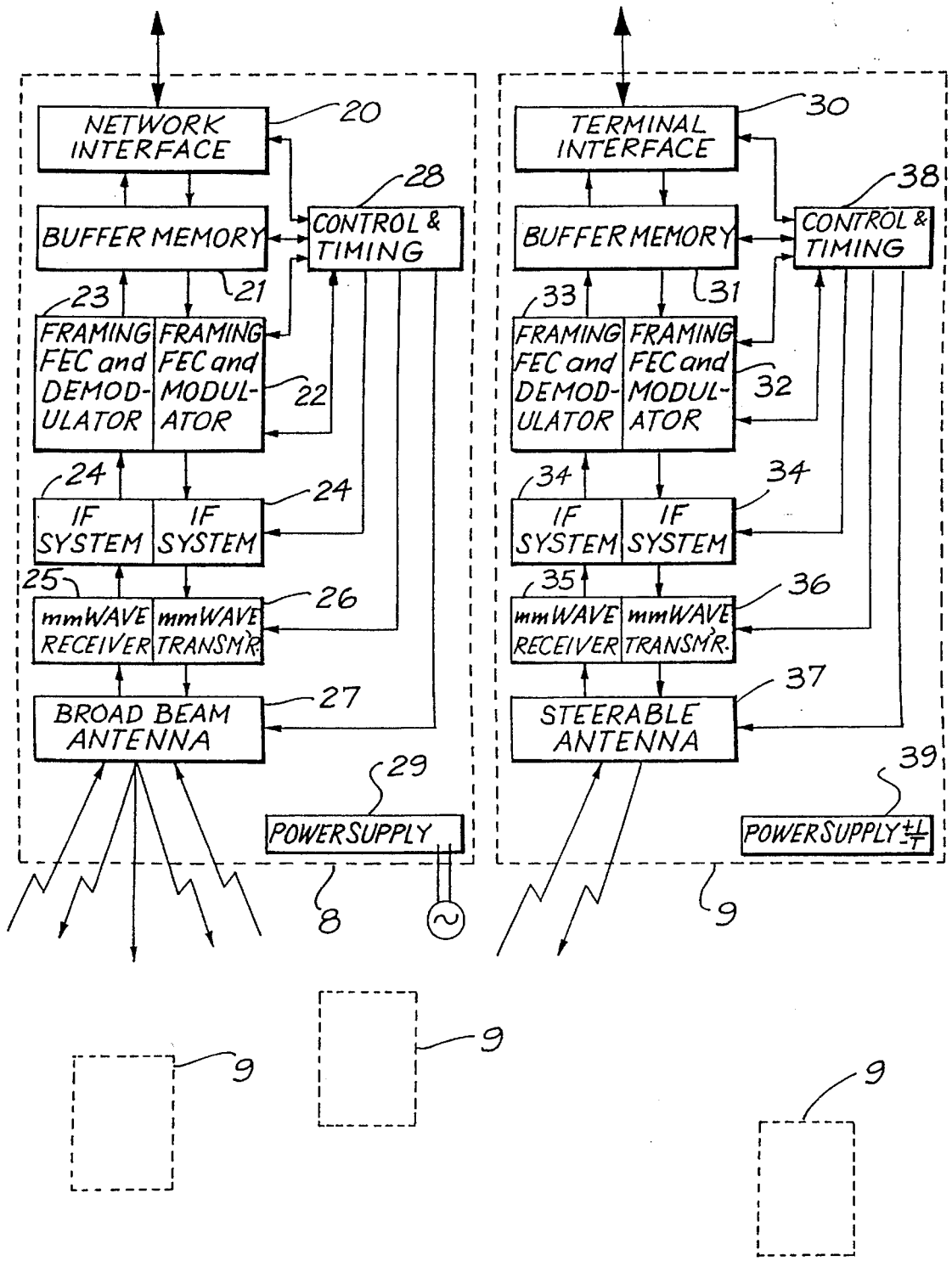
FIG. 5 is a schematic block diagram of the circuit arrangements within each hub and mobile transceiver.

As seen in FIG. 5, for the hub transceiver 8, a number of component blocks are provided. These take the form of a network interface 20, a buffer memory 21, a framing, forward error correction (FEC) and modulating section 22, a framing, forward error correction and demodulation section 23, an IF (intermediate frequency) system section 24, a mm-wave receiver 25, a mm-wave transmitter 26, and an antenna 27 which is sufficiently broad in its radiation pattern to illuminate the entire cell. The antenna 27 can achieve this result statically or dynamically (with electronic or mechanical beam steering). All these items are connected to, and are operable by, a control and timing section 28. In addition, all are powered by an AC mains operable power supply 29.

Equivalent portions of the mobile transceiver 9 are indicated by a designator having a magnitude higher by 10 in FIG. 5 and also in FIGS. 6–9. The mobile transceiver 9 has a battery powered power supply 39. This is possible because of the use of low power gallium arsenide devices in the receiver 35 and transmitter 36, in particular.

It will be noted that the antenna 37 is preferably a steerable antenna which is electronically steerable by the control and timing section 38 so as to at least partially direct the transmissions to and from the mobile transceivers 9 towards the corresponding hub 8. A suitable antenna for this purpose is that disclosed in Applicant's Australian Patent Application No. 66100/94 entitled "A PLANAR ANTENNA", the contents of which are hereby incorporated by cross-reference. This antenna improves the signal to noise ratio on the wireless link and attenuates delayed signals thereby improving multipath performance.

Figure 6:
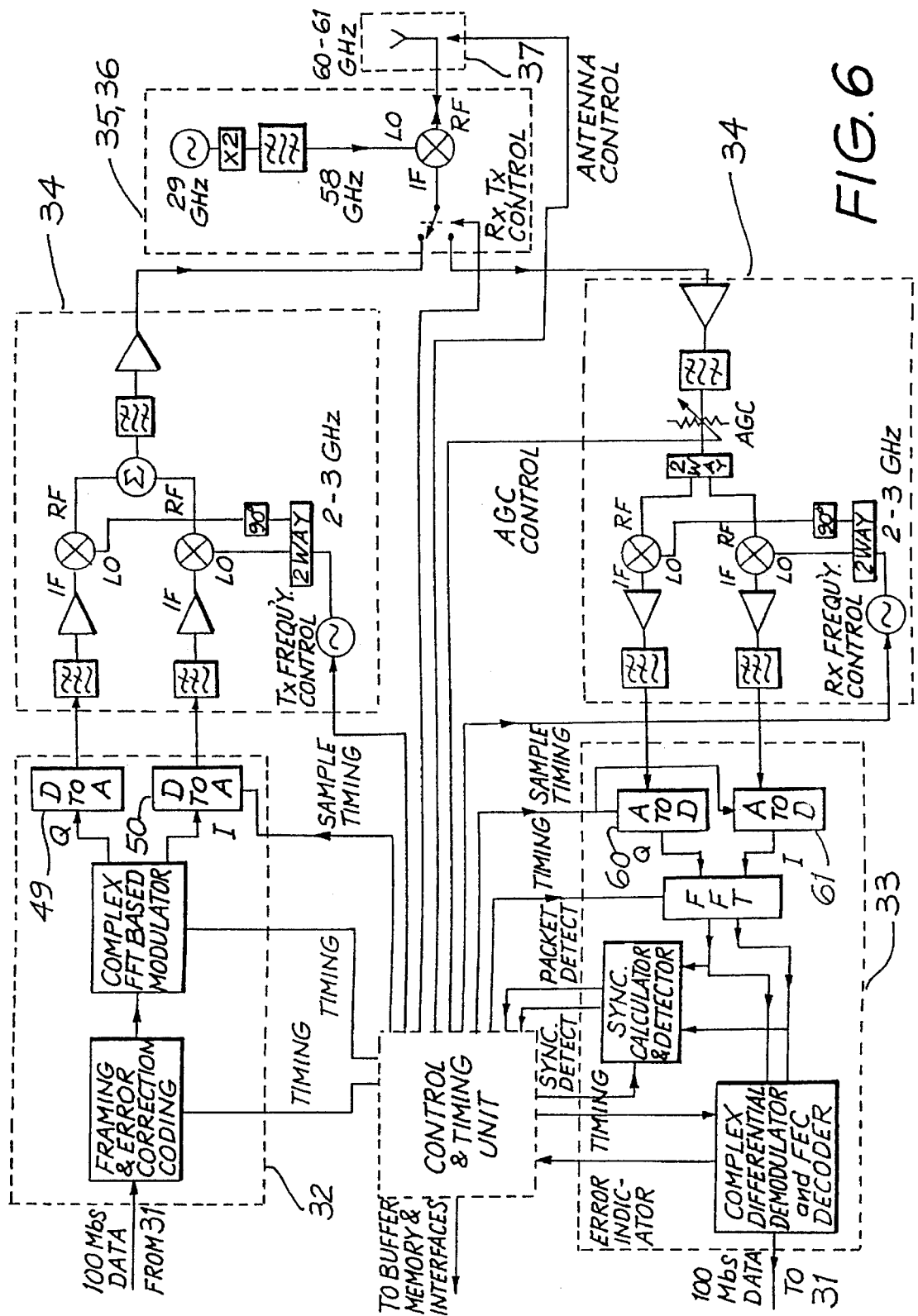
FIG. 6 is a more detailed block diagram illustrating part of the mobile transceiver of FIG. 5.

A more detailed block diagram of a portion of the transceiver 9 is illustrated in FIGS. 6–9. In FIG. 6 the general arrangement of the transceiver 9 (excepting the terminal interface 30 and buffer memory 31) is illustrated. An intermediate stage of detail is given for the receiver 35 and transmitter 36, the receive intermediate frequency system 34 and receive demodulator 33 and the transmit intermediate frequency system 34 and transmit modulator 32. Full details of the modulation are given in FIG. 7 and of the demodulation in FIG. 8.

Figure 7:
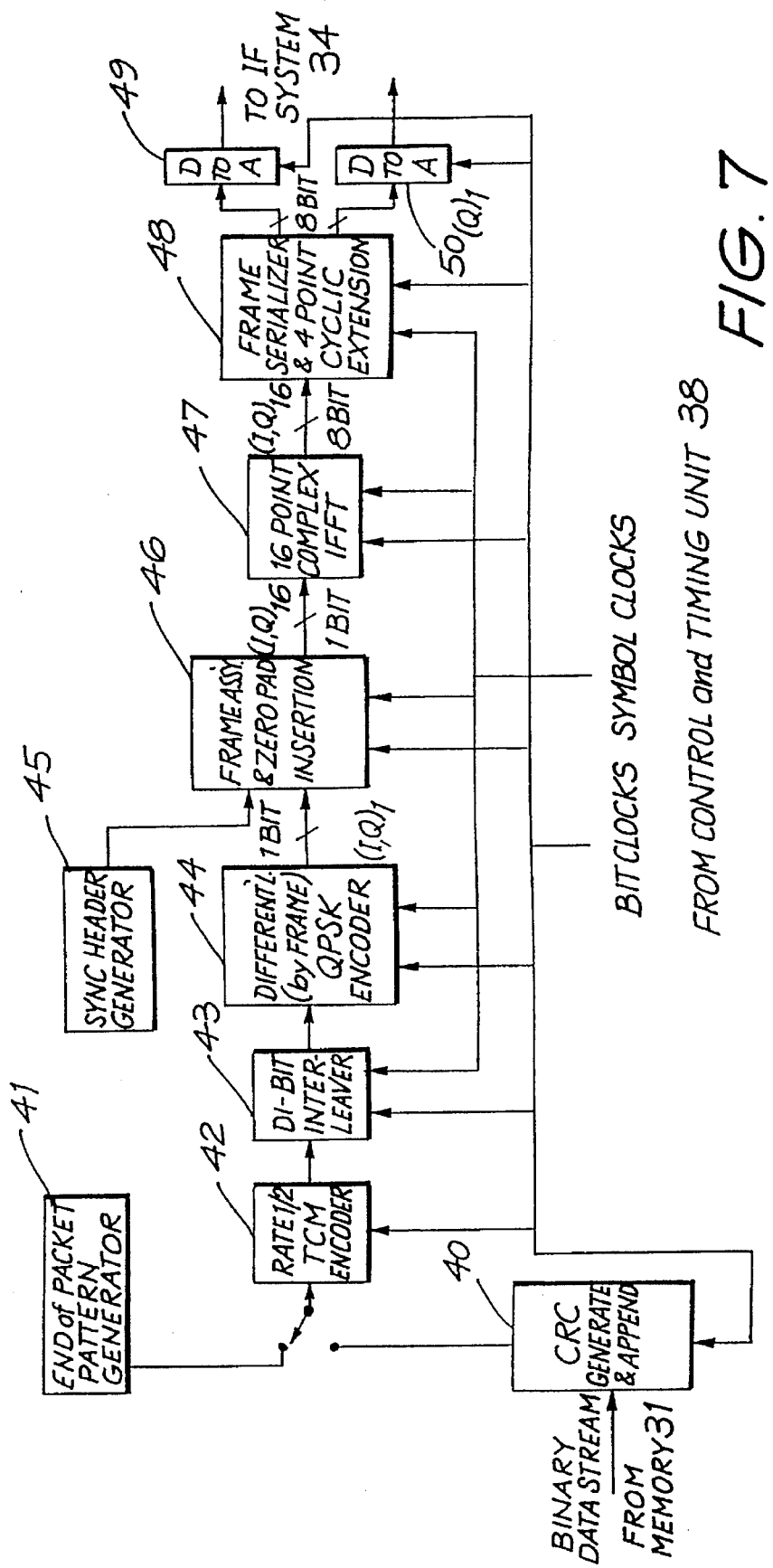
FIG. 7 is a more detailed block diagram of the framing, FEC and modulator section 32 of the transmit path of the mobile transceiver of FIG. 6.

In FIG. 7, the transmit path framing, FEC and modulating section 32 of FIGS. 5 and 6, is illustrated in detail. From the buffer memory 31 of FIG. 5 a binary data stream is applied to a CRC (cyclic redundancy check) Generate and Append block 40. The output of this block 40 or that of an End of Packet Pattern Generator 41 is selectively input to a rate ½ TCM (trellis coded modulation) Encoder 42. The output of encoder 42 is in turn input to a Di-bit Interleaver 43, the output of which is in turn input to a QPSK Encoder 44 which carries out differential encoding on a frame-by-frame basis. The output of QPSK Encoder 44 and a synchronising header generator 45 are combined in frame assembly and zero pad insertion block 46 so that the frames are assembled and four zero pads inserted so that six carriers are generated to each side of, but not coincident with, the centre frequency.

The assembled frames are then passed through an Inverse Fast Fourier Transform device 47 which uses a 16 point complex IFFT. The resultant signal is passed through Frame Serializer and Cyclic Extender block 48 to correctly sequence with 4 point cyclic extension the serial frames. The result is then passed via digital to analogue converters 49,50 to the intermediate frequency stage 34 of FIGS. 5 and 6.

Figure 8:
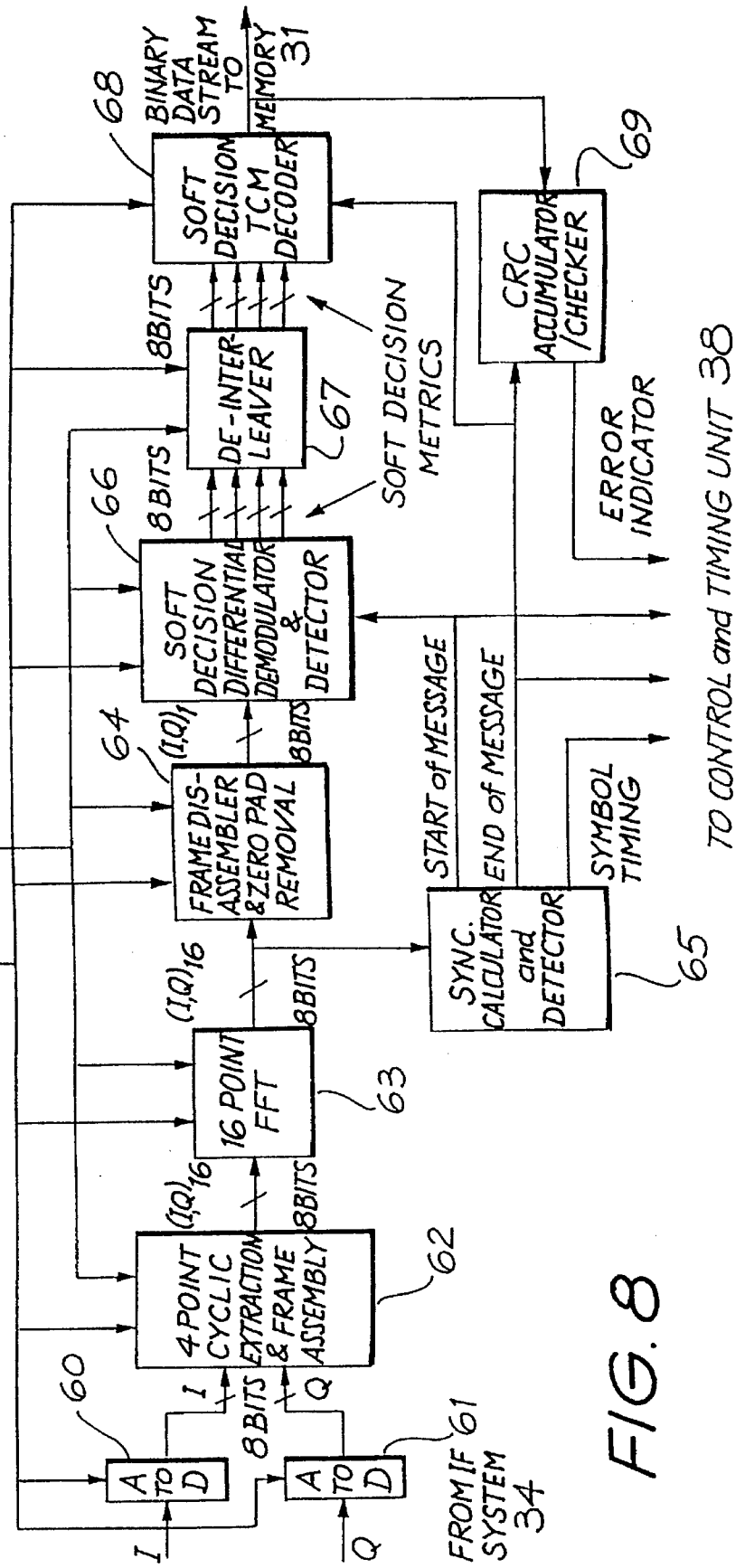
FIG. 8 is more detailed block diagram of the framing, FEC and demodulator section 32 of the mobile transceiver of FIG. 6.

In the receive path in the Framing, FEC and Demodulating section 33 of FIGS. 5 and 6, essentially the reverse procedures are carried out as illustrated in detail in FIG. 8. The received signal from the intermediate frequency stage 34 is passed through the analogue to digital converters 60,61 and thence to the cyclic extractor and frame assembler 62. The resultant signal is passed through the Fast Fourier Transform device 63 to provide the essentially decoded signal. This signal is then simultaneously passed to a frame dis-assembler and zero pad remover 64 and to a synchronising calculator and detector 65 which provides start of message, end of message and symbol timing signals. These are passed to the control and timing unit 38 of FIGS. 5 and 6.

The output of the frame dis-assembler and zero pad remover 64 is passed to a demodulator/detector 66 which carries out the necessary soft decision frame-by-frame differential demodulation and detection. The resulting output is passed to de-interleaver 67 and then to TCM decoder which is again a soft decision decoder. The decoder output is passed both to the buffer memory 31 of FIG. 5 and to CRC Accumulator and Checker 69. This latter device produces an error signal for the control and timing unit 38 of FIGS. 5 and 6 if the demodulating/decoding has not correctly recovered the transmission data.

Figure 9:
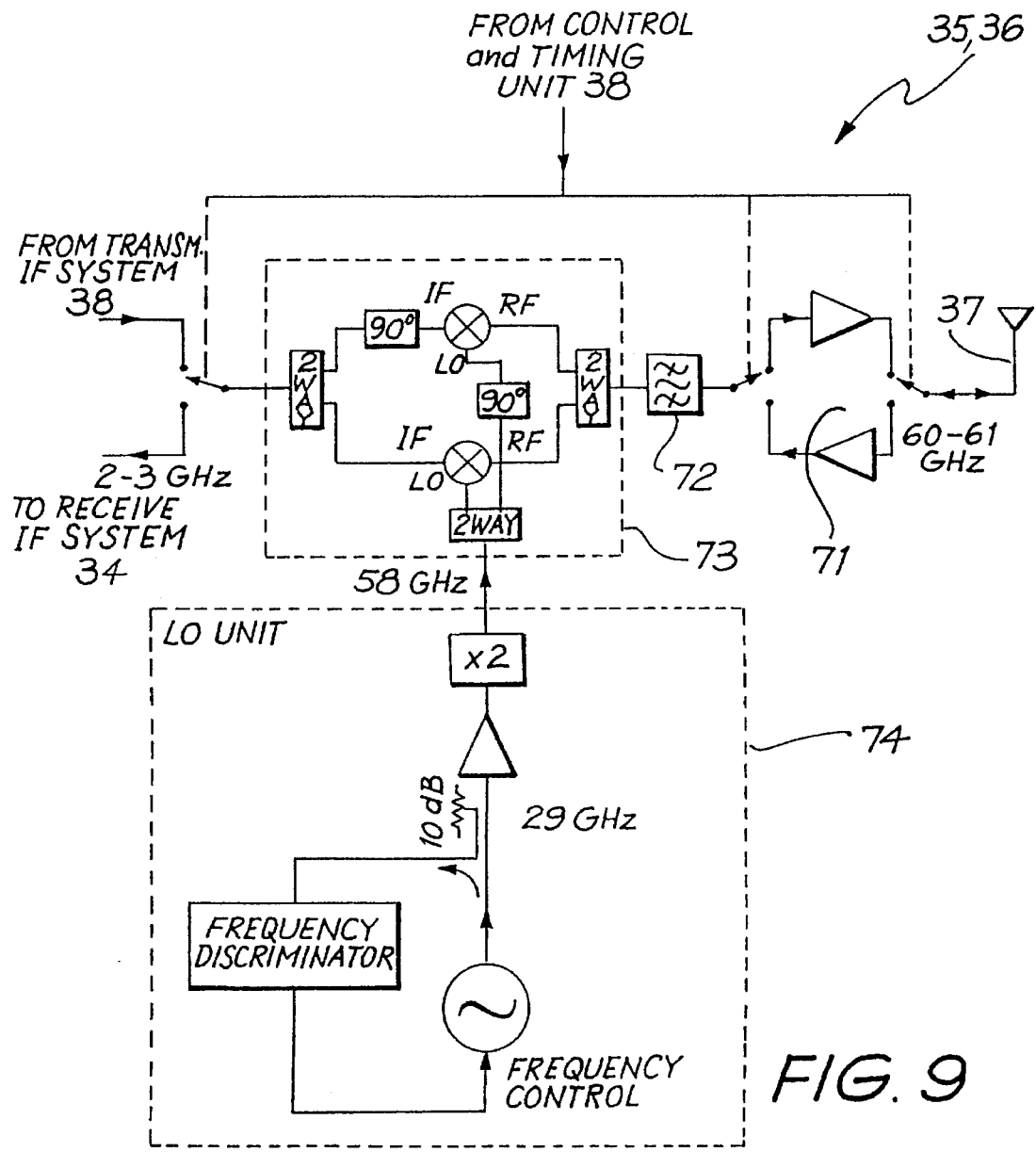
FIG. 9 is a more detailed block diagram of the mm-wave transmitter 36 and receiver 35 of the mobile transceiver of FIG. 6.

Turning now to FIG. 9, from the antenna 37 a schematically indicated bi-directional amplifier 71 leads via a filter 72 to an image rejection mixer 73. The preferred form of bi-directional amplifier 71 is that disclosed in Applicant's co-pending International Patent Application No. PCT/AU94/00704 entitled "A Bi-Directional Amplifier", the contents of which are hereby incorporated by cross-reference. Alternatively the bi-directional amplifier 71 can be realised by use of a separate transmit amplifier and a separate receive amplifier as illustrated connected between the antenna 37 and filter 72 by appropriate switches under the control of the control and timing unit 38 of FIGS. 5 and 6.

The image rejection mixer 73 receives a 58 GHz signal from a local oscillator (LO) unit 74. In the preferred form the first local oscillator (LO) is at a frequency of 58 GHz, resulting in an intermediate frequency band of 2–3 GHz. In the preferred embodiment illustrated in FIG. 9, this signal is obtained by doubling the output signal of a 29 GHz oscillator. It is also preferable to perform some form of frequency stabilization on this oscillator, either by using an external frequency discriminator as illustrated in FIG. 9, a stable internal resonator or some form of frequency/phase locked-loop.

The image rejection mixer 73 is connected to both the receive IF system 34 and the transmit IF system 34 and can be shared between them by the use of an appropriate switch again under the control of the control and timing unit 38 of FIGS. 5 and 6. The use of the filter 72 provides additional rejection of the image frequency.

From FIGS. 6–9, It will be seen that the preferred form of modulation includes not only encoding but also fast fourier transforming, and its inverse. The transceiver 35,36 is preferably realised by means of one or more monolithic Integrated circuits. Furthermore, in order to reduce power consumption in the mobile transceiver 9, the control and timing section 38 can power down each mobile transceiver 9 except when it is transmitting or receiving. This is determined by a polling scheme initiated by the hub transceivers 8. For example, the hub 8 can communicate with each mobile transceiver 9 in turn inquiring if any data is required to be transmitted or access to other parts of the LAN is required. This polling of the various stations can comprise one of a number of standard techniques such as time division multiple access, ALOHA or slotted ALOHA, timed token passing, grant request schemes or other applicable techniques.

The transmissions from the various transceivers 8 and 9 which comprise the network need not necessarily be at the same bit rate since some portions of the network need only a low speed of transmission (eg. printers) while others require a very high speed of transmission. This embodiment enables a variety of rates of transmission to be accommodated in a compatible network. This enables lower cost and/or low power consumption transceivers 9 to be used for printers or low data rate computing devices.

In order to provide a high speed but transmission rate in the hostile radio environment as described above, at least two (and preferably three) techniques are used simultaneously. The first technique is to transmit over a relatively large number of parallel sub-channels within the available bandwidth so that each channel has a low bit rate but the total, or overall bit rate, is high. This spread, by increasing the symbol length, overcomes the problem of delay time and hence decreases the problems caused by inter-symbol interference.

The second technique involves the transmission of the data in small packets having some form of data reliability monitoring and/or enhancement such as Forward Error Correction (FEC). The length of the packet depends upon the method of data reliability enhancement selected and the hostility of the environment. Sufficiently small packets overcome the problem of the rapid time change of the channel characteristics.

The third technique is interleaving (to be described hereafter) which is essentially a further data reliability enhancement. This technique improves the performance or many FEC schemes in overcoming the problems caused by nulls in the channel's frequency response.

In the most favourable environment, use of only ensemble modulation (the first technique) can be sufficient to produce an adequate result. However, such environments are rarely encountered and therefore, in practice, the second technique should be employed in combination with the first technique.

The initial form of the second technique is data reliability enhancement by automatic repeat request (ARQ). The maximum permissible packet length able to be chosen is that which will ensure a practical probability of error free transmission. As the hostility of the environment increases, either channel sounding or a redundancy arrangement such as forward error correction (FEC), and/or data redundancy, and/or permutation modulation should be also used. If necessary, both channel sounding and redundancy technique(s) can be used.

In relation to the first of these techniques, typical time delays due to multipath transmission are of the order of 50 ns because of the dimensions of typical rooms. At a desired bit rate of the order of 100 Mbit/s, this indicates that the bit period is 10 ns which is only 20% of the delay time. However, if the transmission is divided into, say, twelve sub-channels, then in order to achieve a bit rate of 100 Mbit/s overall, this implies that each channel must have a bit rate of approximately 8.3 Mbit/s. If 12 bits are encoded and sent as a symbol, then the symbol time is of the order of 120 ns which is greater than the delay time. The choice of the optimum number of sub-channels depends on the environment.

In relation to the second technique, because of the fading channel, not all the sub-channels can be expected to transmit successfully. For this reason data error correction is provided. This takes a number of forms. The first is redundancy sufficient for the detection of errors so that there may be subsequent re-transmission of at least selected data in which those passages of information not correctly received are re-sent. The re-transmission is not necessarily over the same sub-channel or channel. The second is forward error correction which has a redundancy sufficient for non-interactive correction. A third is permutation modulation such as multi-tone amplitude shift keying which has built-in redundancy. Any of these techniques allow the demodulator to correct for a relatively small percentage of errors in the received bits.

The preferred type of modulation in each sub-channel is multi-level modulation of carrier amplitude and/or phase (mQAM). The modulation family mQAM includes amplitude shift keying (ASK), multi-level ASK (mASK), permutation modulation, binary phase shift keying (BPSK), multi-level phase shift keying (mPSK), amplitude phase keying (APK), multi-level APK (mAPK) and the like.

Transceivers 9 for devices such as printers which require a lower bit rate transmission can use the techniques which give a lower spectral efficiency such as amplitude shift keying (ASK).

A variant of ASK over an ensemble of carriers is called permutation modulation. In this scheme, the transmission is m-ary where a transmitted symbol can encode $\log_2 m$ binary digits. There is an alphabet of m symbols allocated to the channel. Each symbol transmitted has a built in redundancy so that if several of the symbols are received in error due to the poor nature of the corresponding part of the channel, a correct decision can still be made as to which of the allowed symbols was transmitted.

A choice of the symbols with the appropriate orthogonality can be made using a number of well known information theory techniques or by a computer search for the appropriate codes. Due to the high redundancy and limited bandwidth efficiency of permutation modulation, this system does not yield a high spectral efficiency (expressed as bits/Hz). For the system of the illustrated embodiment this can be lower than 0.25 bit/Hz. It is, however, relatively simple to implement and so is desirably used in a lower cost, lower bit rate transceiver 9 for printers, for example, which are compatible with the higher performance embodiments described below.

Another embodiment of the multi-carrier scheme is to phase modulate each carrier using a phase shift keying (PSK). In simple embodiments this is binary phase shift keying (BPSK) where two phase options are transmitted or quadrature phase shift keying (QPSK) where four Phase options are transmitted. Any higher number can be transmitted as required.

In the BPSK embodiment, incorporating forward error correction, the incoming binary data stream at a bit rate "b" is encoded using a conventional forward error correction scheme such as, but not restricted to Reed-Solomon or convolutional coding. Such coding increases the number of bits to be transmitted by a factor "r" which is the reciprocal of the code rate. The encoded stream, at a bit rate b.r, is then split into "pi" parallel paths, and each path used to BPSK modulate a separate carrier in the ensemble, giving an effective symbol duration, on the radio link, of p/(b.r.) seconds.

The resulting signal is then transmitted over the channel and received by the other unit with some sub-channels error free and others with a potentially substantial error rate, due to the frequency selective nature of the channel.

The received carriers are demodulated and the individual bit streams combined (or aggregated) to form an encoded data stream with possible errors (mainly from the bad sub-channels) which is then decoded by a device (such as a Reed-Solomon or Viterbi decoder). Any errors in the received signal are normally completely corrected by this decoding process.

Additionally, a weighting can be given as to the confidence of the accuracy of the output of each BPSK demodulator based upon the amplitude of the received carrier. This weighting can be used as an additional input to the decoding device to determine which bits are more likely to be in error and to increase the performance of this device in correcting as many errors as possible in the transmission.

It is also possible to use combined coding and modulation schemes such as trellis-coded-modulation (TCM) to give improved bandwidth efficiency and improved error correction capability.

It is also possible to use multiple level phase shift keying modulation on each of the carriers transmitted and a corresponding demodulator on the receiver. This will give improved bandwidth efficiency and therefore allow much higher data rates to be transmitted through the channel for the same compatible bandwidth. This option allows higher bit rate units to occupy the same spectrum as the lower bit rate transceivers but in a compatible manner. The increased spectral efficiency is acquired at the cost of increased complexity in the modulators and demodulators, together with some degradation of error performance.

As referred to above, link data interleaving schemes can be used, in this system, to further improve the error correcting performance of FEC codes which distribute the contribution of individual data elements over fewer carriers than the total number in the ensemble. Link data interleaving schemes do this by distributing the encoded data between the carriers in such a way that the correlation in error probability of those carriers associated with any given element of uncoded input data is minimised. On average, this corresponds to maximising the minimum frequency spacing between those carriers.

For example, with a 5-bit constraint length, half rate trellis coded QPSK modulation on the carriers of a 12 carrier ensemble, a suitable interleaving scheme is Carrier number (1–12) modulated by successive encoder output di-bits:

1, 3, 5, 7, 9, 11, 2, 4, 6, 8, 10, 12, 1, 3, . . . etc.

Such an interleaving scheme is typically implemented by means of demultiplexers, shift registers and multiplexers in substantially conventional fashion.

The above will improve the error rate performance of the system, however, it will not eliminate all errors in all cases. To overcome any residual errors in the system an additional error correction layer, such as cyclic redundancy checked (CRC) automatic repeat request (ARQ),can be used. This error correction layer requests the re-transmission of those symbols which are believed to be in error. This re-transmission can occur over the same frequency channel, or a request can be made to the control and timing section to shift the entire frequency channel by some predetermined amount, or to change antenna characteristics such as polarisation, to increase the probability of error free transmission.

Because of the highly time variable nature of the transmission channel, the transmitted data is divided into packets of short duration (typically 100 microseconds). During this short time period it is satisfactory to assume that the transmission characteristics are essentially stationary. Before transmission of a packet of data, it is possible to use a channel selection technique to reduce error rates. One channel selection technique is to channel sound prior to transmission of the packet. If necessary, this allows the data rate to be reduced if a particular sub-channel or channel is found to be degraded.

As illustrated in FIGS. 7 and 8 the preferred method of generating and demodulating multi-carrier modulation schemes uses a device capable of performing Fast Fourier Transforms (FFTs) and Inverse Fast Fourier Transforms (IFFTs) on complex data at high speeds. Such a device is described in Australian Patent No. 610,934 entitled "A Transform Processing Circuit" granted to the present applicants, the disclosure of which is hereby incorporated by cross-reference. In the example shown in FIGS. 7 and 8, 16 point fast Fourier transformation is used.

Improved performance can be obtained by using cyclic extension by means of circuit 48 and cyclic extraction by means of circuit 62 in conjunction with the fast Fourier transformation. Cyclic extension is a technique for enhancing the multi-path tolerance of FFT-based ensemble modulation schemes by reducing the degradation of sub-channel orthogonality produced by channel delay spread effects and demodulator timing errors. It consists, at the modulator, of extending the time duration of individual multicarrier symbols by appending, to the FFT output frame, a copy of that frame, then truncating the combination to the desired length. The length of the extension is a compromise between tolerance to multipath induced intra-symbol interference and the reduction of channel spectral efficiency. It preferably corresponds to the time interval over which the channel impulse response has substantial energy.

At the extractor and frame assembler 62, an essentially uncorrupted multicarrier symbol is excised (by cyclic extraction) from the potentially distorted incoming extended symbol, whose ends may be corrupted by the extended impulse response of a multipath channel. This excised symbol is then used in the FFT based demodulation process. For example, when using a 16 point FFT, a cyclic extension length of 4 points can be used.

These processes can be effectively Implemented by a slight extension of the frame assembly/disassembly mechanism required for the FFT interface. A related (but more computationally intensive) process is that of "tapering" or "windowing", whereby the amplitude of the multicarrier symbol is varied over part of the symbol time in order to reduce the mutual cross-talk of sub-channels more than a few carrier spacings apart in frequency.

When using multi-carrier schemes it is not always desirable to occupy the full band and some carriers need not be transmitted. For example, when using an FFT device 63 the analogue (reconstruction/anti-aliasing) filter selectivity requirements, for given adjacent channel suppression/rejection, can be relaxed by using a larger transform whose higher frequency bins are zero-filled in the modulator and ignored in the demodulator. This corresponds to not generating the higher frequency (out-of-band) carriers at the transmitter and ignoring any received energy at those frequencies, so the FFT provides (subject to dynamic range considerations) a significant part of the band edge selectivity. Zero insertion can also be used to remove the band-centre carrier (DC at baseband) to reduce susceptibility to DC offset drifts in the system. For example, when using a 16 point FFT device 63 only 12 carriers are preferably used.

As shown in FIG. 6, a device 65 is required to synchronize the receiver to the incoming data. This device can, for example, compare this incoming data to the receiver's timing signals, calculate the difference in symbol and bit times and pass this information to the control and timing unit which would then perform the appropriate corrections to achieve synchronization or zero difference.

A preferred synchronisation scheme, having multipath tolerance commensurate with ensemble modulation and sharing of the FFT hardware, determines multicarrier symbol timing and gross local oscillator frequency difference by measurement of the relative phases of several carriers present in the message header generated by generator 45 and comparison of these with the known phase relationship of the transmitted carriers at the beginning of the header transmission.

The IF systems 34 are shown in FIG. 6 and consists of an I,Q up converter for the transmitter and I,Q down converter for the receiver. The second LO units of the IF systems 34 are tuned over the band 2–3 GHz and this allows the conversion of the signals to and from baseband. In some embodiments It is preferable to provide tuning of the carrier frequency by varying the frequency of the first local oscillator 74 (FIG. 9) and in others by varying the frequency of the second local oscillator in the IF system. It is possible to share some of the components in the transmit and receive IF systems.

The foregoing describes only some embodiments of the present invention and modifications can be made thereto without departing from the scope of the present invention. For example, interleaving and bit reversal of the transmitted data to decrease the received error rate can be accomplished by utilizing the bit reversal inherent in the FFT conversion. Also the antenna 37 can utilize polarisation diversity to improve reception.

One arrangement for the simultaneous operation of low bit rate transceivers and high bit rate transceivers is to allocate, say, half the available (high bit) channel to the low bit rate transceivers. Thus, the low bit rate transceivers utilize only half of the available bandwidth and a hub can transmit data at the low rate to two low bit rate transceivers at the same time. Thus the same hub hardware is used for both high bit and low bit rate transmissions.

It will be clear to those skilled in the art that the LAN need not incorporate hubs 8 since the mobile transceivers 9 can transmit to, and from, each other directly within the predetermined cell range. Such a LAN is termed a peer-to-peer LAN.

Similarly, the hubs 8 although described as being interconnected by electric cable and/or optical fibre, can also be inter-connected by a radio or infra-red link. The link can form a part or the backbone 10 or constitute the inter-huh communication link.

What we claim is:

1. A wireless LAN comprising:
   a plurality of hub transceivers coupled together to constitute a plurality of data sources and destinations; and
   a plurality of mobile transceivers each coupled to data processing means and between each said data processing means and a corresponding said transceiver data passes to be transmitted or received, said transceivers being for data transceiving operation by radio transmissions to one of said hub receivers in a confined multipath environment, and each transceiver comprising: antenna means coupled to transmission signal processing means and to reception signal processing means, said transmission signal processing means in turn coupled to an input data channel, and said reception signal processing means in turn coupled to an output data channel, each said transceiver being operable to transmit and receive data at radio frequencies in excess of 10 GHz, and said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths.

2. A wireless LAN as claimed in claim 1, wherein said transmission signal processing means further comprises means to provide data reliability enhancement to said input data passed to said modulation means.

3. A wireless LAN as claimed in claim 2, wherein said data reliability enhancement is Forward Error Correction.

4. A wireless LAN as claimed in claim 3, wherein said transmission signal processing means further comprises means, interposed between said data reliability enhancement means and said modulation means, for interleaving blocks of said input data.

5. A wireless LAN as claimed in claims 4, wherein said blocks of said input data are bits.

6. A wireless LAN as claimed in claim 1, wherein said modulation means performs, for each said sub-channel, multi-level amplitude and/or phase modulation (mQAM).

7. A wireless LAN as claimed in claim 6, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).

8. A wireless LAN as claimed in claim 1, wherein said reception signal processing means comprises demodulation means for demodulating received symbols of said plurality of sub-channels into output data for said output data channel.

9. A wireless LAN as claimed in claim 1, further comprising switching means for selectively coupling said antenna means to said transmission signal processing means for transmission of data and to said reception signal processing means for reception of data.

10. A wireless LAN comprising:
a plurality of hub transceivers coupled together to constitute a plurality of data sources and destinations; and
a plurality of mobile transceivers each coupled to data processing means and between each said data processing means and a corresponding said transceiver data passes to be transmitted or received, said transceivers being for data transceiving operation by radio transmissions to one of said hub receivers in a confined multipath environment, and each transceiver comprising: antenna means coupled to transmission signal processing means and to reception signal processing means, said transmission signal processing means in turn coupled to a input data channel, and said reception signal processing means in turn coupled to a output data channel, each said transceiver being operable to transmit and receive data at radio frequencies, said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths, means to apply a data reliability enhancement to said data passed to said modulation means and means, interposed between said data reliability enhancement means and said ensemble modulation means, for interleaving blocks of said data.

11. A wireless LAN as claimed in claim 10, wherein said data reliability enhancement is Forward Error Correction.

12. A wireless LAN as claimed in claim 11, wherein said blocks of said input data are bits.

13. A wireless LAN as claimed in claim 10, wherein said modulation means performs, for each said sub-channel, multi-level amplitude and/or phase modulation (mQAM).

14. A wireless LAN as claimed in claim 13, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).

15. A wireless LAN as claimed in claim 10, wherein said reception signal processing means comprises demodulation means for demodulating received symbols of said plurality of sub-channels into output data for said output data channel.

16. A wireless LAN as claimed in claim 10, further comprising switching means for selectively coupling said antenna means to said transmission signal processing means for transmission of data and to said reception signal processing means for reception of data.

17. A peer-to-peer wireless LAN comprising:
a plurality of mobile transceivers for data transceiving operation by radio transmissions between ones thereof in a confined multipath environment, each said transceiver being coupled to a data processing means, and between each said data processing means and a corresponding said transceiver data passes to be transmitted or received, each said transceiver comprising: antenna means coupled to transmission signal processing means and to reception signal processing means, said transmission signal processing means in turn coupled to an input data channel, and said reception signal processing means in turn coupled to an output data channel, each said transceiver being operable to transmit and receive data at radio frequencies in excess of 10 GHz, and said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths.

18. A peer-to-peer wireless LAN as claimed in claim 17, wherein said transmission signal processing means further comprises means to provide data reliability enhancement to said input data passed to said modulation means.

19. A peer-to-peer wireless LAN as claimed in claim 18, wherein said data reliability enhancement is Forward Error Correction.

20. A peer-to-peer wireless LAN as claimed in claim 19, wherein said transmission signal processing means further comprises means, interposed between said data reliability enhancement means and said modulation means, for interleaving blocks of said input data.

21. A peer-to-peer wireless LAN as claimed in claim 20, wherein said blocks of said data are bits.

22. A peer-to-peer wireless LAN as claimed in claim 17, wherein said modulation means performs, for each said sub-channel, multi-level amplitude and/or phase modulation (mQAM).

23. A peer-to-peer wireless LAN as claimed in claim 22, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).

24. A peer-to-peer wireless LAN as claimed in claim 17, wherein said reception signal processing means comprises demodulation means for demodulating received symbols of said plurality of sub-channels into output data for said output data channel.

25. A peer-to-peer wireless LAN as claimed in claim 17, further comprising switching means for selectively coupling said antenna means to said transmission signal processing means for transmission of data and to said reception signal processing means for reception of data.

26. A peer-to-peer wireless LAN comprising:
a plurality of mobile transceivers for data transceiving operation by radio transmissions between ones thereof in a confined multipath environment, each said transceiver being coupled to a data processing means, and between each said data processing means and a corresponding said transceiver data passes to be transmitted or received, each said transceiver comprising: antenna means coupled to transmission signal processing means and to reception signal processing means, said transmission signal processing means in turn coupled to an input data channel, and said reception signal processing means in turn coupled to an output data channel, each said transceiver being operable to transmit and receive data at radio frequencies, said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths, means to apply data reliability enhancement to said data passed to said ensemble modulation means and means, interposed between said data reliability enhancement means and said ensemble modulation means, for interleaving blocks of said data.

27. A peer-to-peer LAN as claimed in claim 26, wherein said data reliability enhancement is Forward Error Correction.

28. A peer-to-peer LAN as claimed in claim 27, wherein said blocks of said input data are bits.

29. A peer-to-peer LAN as claimed in claim 26, wherein said modulation means performs, for each said sub-channel, multi-level amplitude and/or phase modulation (mQAM).

30. A peer-to-peer LAN as claimed in claim 29, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).

31. A peer-to-peer wireless LAN as claimed in claim 26, wherein said reception signal processing means comprises demodulation means for demodulating received symbols of said plurality of sub-channels into output data for said output data channel.

32. A peer-to-peer wireless LAN as claimed in claim 26, further comprising switching means for selectively coupling said antenna means to said transmission signal processing means for transmission of data and to said reception signal processing means for reception of data.

33. A transceiver for operation in a confined multipath transmission environment, said transceiver comprising antenna means coupled to transmission signal processing means and to reception signal processing means, said transmission signal processing means in turn coupled to an input data channel, and said reception signal processing means in turn coupled to an output data channel, said transceiver being operable to transmit and receive data at radio frequencies in excess of 10 GHz, and said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths.

34. A transceiver as claimed in claim 33, wherein said transmission signal processing means further comprises means to provide data reliability enhancement to said input data passed to said modulation means.

35. A transceiver as claimed in claim 34, wherein said data reliability enhancement is Forward Error Correction.

36. A transceiver as claimed in claim 35, wherein said transmission signal processing means further comprises means, interposed between said input data reliability enhancement means and said modulation means, for interleaving blocks of said data.

37. A transceiver as claimed in claim 36, wherein said blocks of said data are bits.

38. A transceiver as claimed in claim 33, wherein said modulation means performs, for each said sub-channel, multi-level amplitude and/or phase modulation (mQAM).

39. A transceiver as claimed in claim 38, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).

40. A transceiver as claimed in claim 33, wherein said reception signal processing means comprises demodulation means for demodulating received symbols of said plurality of sub-channels into output data for said output data channel.

41. A transceiver as claimed in claim 33, further comprising switching means for selectively coupling said antenna means to said transmission signal processing means for transmission of data and to said reception signal processing means for reception of data.

42. A transceiver for operation in a confined multipath transmission environment, said transceiver comprising antenna means coupled to transmission signal processing means and to reception signal processing means, said transmission signal processing means in turn coupled to an input data channel, and said reception signal processing means in turn coupled to an output data channel, said transceiver being operable to transmit and receive data at radio frequencies, said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths, means to apply data reliability enhancement to said data passed to said modulation means and means, interposed between said data reliability enhancement means and said modulation means, for interleaving blocks of said data.

43. A transceiver as claimed in claim 42, wherein said data reliability enhancement is Forward Error Correction.

44. A transceiver as claimed in claim 43, wherein said blocks of said input data are bits.

45. A transceiver as claimed in claim 42, wherein said modulation means performs, for each said sub-channel, multi-level amplitude and/or phase modulation (mQAM).

46. A transceiver as claimed in claim 45, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).

47. A transceiver as claimed in claim 42, wherein said reception signal processing means comprises ensemble demodulation means for demodulating received symbols of said plurality of sub-channels into data for said output data channel.

48. A transceiver as claimed in claim 42, further comprising switching means for selectively coupling said antenna means to said transmission signal processing means for transmission of data and to said reception signal processing means for reception of data.

49. A transmitter for operation in a confined multipath transmission environment, said transmitter comprising antenna means coupled to transmission signal processing means in turn coupled to an input data channel, said transmitter being operable to transmit data at radio frequencies in excess of 10 GHz, and said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths.

50. A transmitter as claimed in claim 49, wherein said transmission signal processing means further comprises means to provide data reliability enhancement to said data passed to said modulation means.

51. A transmitter as claimed in claim 50, wherein said data reliability enhancement is Forward Error Correction.

52. A transmitter as claimed in claim 51, wherein said transmission signal processing means further comprises means, interposed between said data reliability enhancement means and said modulation means, for interleaving blocks of said data.

53. A transmitter as claimed in claim 52, wherein said blocks of said input data are bits.

54. A transmitter as claimed in claim 49, wherein said modulation means performs, for each said sub-channel, multi-level amplitude and/or phase modulation (mQAM).

55. A transmitter as claimed in claim 54, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).

56. A transmitter for operation in a confined multipath transmission environment, said transmitter comprising antenna means coupled to transmission signal processing means in turn coupled to an input data channel, said transmitter being operable to transmit data at radio frequencies, said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths, means to apply data reliability enhancement to said data passed to said modulation means and means, interposed between said data reliability enhancement means and said modulation means, for interleaving blocks of said data.

57. A transmitter as claimed in claim 56, wherein said data reliability enhancement is Forward Error Correction.

58. A transmitter as claimed in claim 57, wherein said blocks of said input data are bits.

59. A transmitter as claimed in claim 56, wherein said modulation means performs, for each said sub-channel, multi-level amplitude and/or phase modulation (mQAM).

60. A transmitter as claimed in claim 59, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).

61. A method for transmitting data in a confined multipath transmission environment at radio frequencies in excess of 10 GHz, said data being provided by an input data channel coupled to transmission signal processing means in turn coupled to antenna means, said method comprising the steps of:

modulating said data, by modulation means of said transmission signal processing means, into a plurality of sub-channels comprised of a sequence of data symbols such that the period of a sub-channel symbol is longer than a predetermined period representative of the time delay of significant ones of non-direct transmission paths; and transmitting, by said antenna means, said sub-channel symbols at said radio frequencies in excess of 10 GHz.

62. A method as claimed in claim 61, comprising the further step of providing data reliability enhancement to said data in advance of said modulation step.

63. A method as claimed in claim 62, wherein said data reliability enhancement is Forward Error Correction.

64. A method as claimed in claim 63, comprising the further step of interleaving blocks of said input data between the steps of providing data reliability enhancement monitoring and step of modulation.

65. A method as claimed in claim 64, wherein said blocks of input data are bits.

66. A method as claimed in claim 61, wherein said step of modulation is multi-level amplitude and/or phase modulation (mQAM).

67. A method as claimed in claim 66, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).

68. A method for transmitting data in a confined multipath transmission environment of radio frequencies, said data being provided by an input data channel coupled to transmission signal processing means in turn coupled to antenna means, said method comprising the steps of:

applying data reliability enhancement to said data;

interleaving blocks of said enhanced data;

modulating said data, by modulation means of said transmission signal processing means, into a plurality of sub-channels comprised of a sequence of data symbols such that the period of a sub-channel symbol is longer than a predetermined period representative of significant ones of non-direct transmission paths; and transmitting, by said antenna means, said sub-channel symbols.

69. A method as claimed in claim 68, wherein said data reliability enhancement is Forward Error Correction.

70. A method as claimed in claim 69, wherein said blocks of input data are bits.

71. A method as claimed in claim 68, wherein said steps of modulation is multi-level amplitude and/or phase modulation (mQAM).

72. A method as claimed in claim 71, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).

* * * * *

US005487069C1

(12) EX PARTE REEXAMINATION CERTIFICATE (8082nd)
United States Patent
O'Sullivan et al.

(10) Number: US 5,487,069 C1
(45) Certificate Issued: Mar. 15, 2011

(54) WIRELESS LAN

(75) Inventors: John D. O'Sullivan, Ermington (AU); Graham R. Daniels, Willoughby (AU); Terence M. P. Percival, Lane Cove (AU); Diethelm I. Ostry, Petersham (AU); John F. Deane, Eastwood (AU)

(73) Assignee: Commonwealth Scientific and Industrial Research Organization, Australian Capital Territory (AU)

Reexamination Request:
No. 90/010,367, Dec. 22, 2008

Reexamination Certificate for:
Patent No.: 5,487,069
Issued: Jan. 23, 1996
Appl. No.: 08/157,375
Filed: Nov. 23, 1993

(30) Foreign Application Priority Data

Nov. 27, 1992 (AU) ............................................. PL6069

(51) Int. Cl.
*H04L 12/28* (2006.01)
*H04L 5/02* (2006.01)
*H04L 1/18* (2006.01)
*H04L 1/16* (2006.01)
*H04L 1/00* (2006.01)

(52) U.S. Cl. ........................ 370/404; 370/338; 375/284; 375/348; 455/65; 455/506

(58) Field of Classification Search .................. None
See application file for complete search history.

(56) References Cited

U.S. PATENT DOCUMENTS

| 3,488,445 A | 1/1970 | Chang |
| 3,511,936 A | 5/1970 | Saltzberg |
| 3,605,019 A | 9/1971 | Cutter |
| 3,652,998 A | 3/1972 | Forney, Jr. |
| 4,039,961 A | 8/1977 | Ishio et al. |
| 4,199,809 A | 4/1980 | Pasahow et al. |
| 4,630,314 A | 12/1986 | Smith |
| 4,679,227 A | 7/1987 | Hughes-Hartogs |
| 4,789,983 A | 12/1988 | Acampora et al. |
| 4,807,253 A | 2/1989 | Hagenauer et al. |
| 4,833,706 A | 5/1989 | Hughes-Hartogs |
| 4,881,241 A | 11/1989 | Pommier et al. |
| 4,888,767 A | 12/1989 | Furuya et al. |
| 4,914,699 A | 4/1990 | Dunn et al. |
| 4,941,144 A | 7/1990 | Mizukami |
| 4,980,897 A | 12/1990 | Decker et al. |
| 4,982,442 A | 1/1991 | Sarokhanian |
| 5,029,185 A | 7/1991 | Wei |
| 5,048,057 A | 9/1991 | Saleh et al. |
| 5,063,574 A | 11/1991 | Moose |
| 5,095,535 A | 3/1992 | Freeburg |
| 5,151,920 A * | 9/1992 | Haagh et al. ................. 375/150 |

(Continued)

FOREIGN PATENT DOCUMENTS

AU        51806/93 B       6/1994

(Continued)

OTHER PUBLICATIONS

Freeburg, Thomas, "Enabling Technologies for Wireless In-Building Network Communications—Four Technical Challenges, Four Solutions," IEEE Communications Magazine, Apr. 1991.*

(Continued)

*Primary Examiner*—Colin M Larose

(57) ABSTRACT

The present invention discloses a wireless LAN, a peer-to-peer wireless LAN, a wireless transceiver and a method of transmitting data, all of which are capable of operating at frequencies in excess of 10 GHz and in multipath transmission environments. This is achieved by a combination of techniques which enable adequate performance in the presence of multipath transmission paths where the reciprocal of the information bit rate of the transmission is short relative to the time delay differences between significant ones of the multipath transmission paths. In the LANs the mobile transceivers are each connected to, and powered by, a corresponding portable electronic device with computational ability.

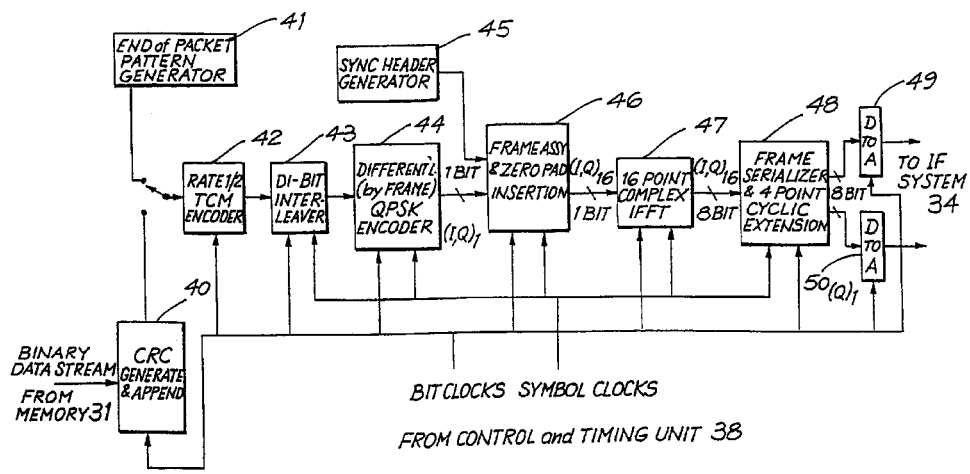

U.S. PATENT DOCUMENTS

| | | | |
|---|---|---|---|
| 5,159,592 A | * 10/1992 | Perkins | 370/338 |
| 5,191,576 A | 3/1993 | Pommier et al. | |
| 5,197,061 A | 3/1993 | Halbert-Lassalle et al. | |
| 5,220,584 A | 6/1993 | Burns | |
| 5,247,382 A | * 9/1993 | Suzuki | 398/201 |
| 5,276,703 A | 1/1994 | Budin et al. | |
| 5,282,222 A | 1/1994 | Fattouche et al. | |
| 5,283,780 A | 2/1994 | Schuchman et al. | |
| 5,561,686 A | 10/1996 | Kobayashi et al. | |
| 5,596,604 A | 1/1997 | Cioffi et al. | |
| 6,507,629 B1 | 1/2003 | Hatakeyama | |
| 6,625,763 B1 | 9/2003 | Boner | |
| 6,934,901 B2 | 8/2005 | Dagan et al. | |
| 7,019,753 B2 | 3/2006 | Rappaport et al. | |
| 7,085,697 B1 | 8/2006 | Rappaport et al. | |
| 7,295,119 B2 | 11/2007 | Rappaport et al. | |

FOREIGN PATENT DOCUMENTS

| | | |
|---|---|---|
| EP | 0369817 A2 | 5/1990 |
| EP | 0 667 695 A1 | 8/1995 |
| FR | 2660131 | 9/1991 |
| JP | 3438918 | 1/1982 |
| JP | 57-159148 | 10/1982 |
| JP | 61-199340 | 9/1986 |
| JP | 63-190492 | 8/1988 |
| JP | 63-304745 | 12/1988 |
| JP | 01-122241 | 5/1989 |
| JP | 01-147926 | 6/1989 |
| JP | 01-170147 | 7/1989 |
| JP | 03-283743 | 12/1991 |
| JP | 04-016038 | 1/1992 |
| JP | 05-056045 | 3/1993 |
| WO | WO 92/07435 A | 4/1992 |
| WO | WO 93/04546 A1 | 3/1993 |

OTHER PUBLICATIONS

ETSI Directives, Version 002, Nov. 1990, 53 pages.

ETSI Directives, Version 004, Apr. 1992, 35 pages.

ETSI Directives, Version 005, Mar. 1993, 64 pages.

ETSI Directives, Version 006, Mar. 1994, 64 pages.

Iversen, Eric J., "Standardization and Intellectual Property Rights: ETSI's controversial search for new IPR–procedures", IEEE Conference on Standardization and Innovation, Aachen, Germany, 1999, 9 pages.

Blind et al., "Study on the Interaction between Standardisation and Intellectual Property Rights", Fraunhofer Institute Systems and Innovation Research, EC Contract No. G6MA–CT–2000–02001, Aug. 2002, 263 pages.

Hoeher, Peter, "TCM on Frequency–Selective Land–Mobile Fading Channels", German Aerospace Research Establishment (DLR), Institute for Communications Technology, pp. 1–12.

Hoeher, Peter, "TCM on Frequency–Selective Land–Mobile Fading Channels", Proceedings of the Fifth Tirrenia International Workshop on Digital Communications, Tirrenia, Italy, pp. 317–329, Sep. 8–12, 1991.

IEEE Std. 802.11, Part 11: Wireless LAN Medium Access Control (MAC) and Physical Layer (PHY) specifications, LAN MAN Standards Committee of the IEEE Computer Society, Jun. 26, 1997, pp. 1–466.

IEEE Std. 802.11, 1999, Part 11: Wireless LAN Medium Access Control (MAC) and Physical Layer (PHY) Specifications, LAN MAN Standards Committee of the IEEE Computer Society, pp. 1–528.

IEEE Std. 802.11a, Part 11: Wireless LAN Medium Access Control (MAC) and Physical Layer (PHY) specifications, High–speed Physical Layer in the 5 GHz Band, LAN MAN Standards Committee of the IEEE Computer Society, Jun. 12, 2003, pp. 1–91.

IEEE Std. 802.11b, Part 11: Wireless LAN Medium Access Control (MAC) and Physical Layer (PHY) specifications, Amendment 2: Higher–Speed Physical Layer Extension in the 2.4 GHz Band, LAN MAN Standards Committee of the IEEE Computer Society, Sep. 16, 1999, pp. 1–96.

IEEE Std. 802.11b, Part 11: Wireless LAN Medium Access Control (MAC) and Physical Layer (PHY) specifications, Amendment 2: Higher–speed Physical Layer (PHY) extension in the 2.4 GHz band; LAN MAN Standard Committee of the IEEE Computer Society, Nov. 7, 2001, pp. 1–24.

IEEE Std. 802.11g, Part 11: Wireless LAN Medium Access Control (MAC) and Physical Layer (PHY) specifications, LAN MAN Standards Committee of the IEEE Computer Society, Jun. 27, 2003, pp. 1–78.

Wilkinson et al., COFDM for Hiperlan, ETSI RES10–R92.13, Bradford University, May 4, 1992, pp. 1–2.

IEEE Std. 802.11n, Part 11: Wireless LAN Medium Access Control (MAC) and Physical Layer (PHY) Specifications, LAN MAN Standards Committee of the IEEE Computer Society, Feb. 2007, pp. 1–498.

Aazhang, Convolutional Codes, Connexions Web site: http://cnx.org/content/m10181/2.7/, Jan. 22, 2009, pp. 1–3.

Alard et al., "Principles of Modulation and Channel Coding for Digital Broadcasting for Mobile Services," EBU Review—Technical No. 224, , Aug. 1987, pp. 168–190.

Alard et al., "A New System of Sound Broadcasting to Mobile Receivers", Centre Commun d'Etude de Télécommunication et Télédiffusion, France, 1988, pp. 416–420.

Aldinger, "Multicarrier COFDM scheme in high bitrate radio local area networks," Fifth IEEE PIMRC Conference, 1994, pp. 969–973.

ARRL Handbook for Radio Amateurs, American Radio Relay League, 68th ed, 1991, pp. 17–1 to 17–22, 19–7 to 19–8.

Bahl et al., "Optimal Decoding of Linear Codes for Minimizing Symbol Error Rate", IEEE Transactions on Information Theory, vol. IT–20, Mar. 1974, pp. 284–287.

Baker et al., "Advanced HF Digital Networks," Proceedings of the Military Communications Conference, 1991, pp. 929–933.

Baker, "Adaptive Data Communication Techniques for HF Systems", Millitary Communications Conference, 1993, IEEE on Communications on the Move, vol. 1, Oct. 1993, pp. 57–61.

Balanis, Antenna Theory Analysis and Design, 2005, pp. 1–10.

Bantz et al., "Wireless LAN Design Alternatives", IEEE Network, vol. 8, No. 2, Mar./Apr. 1994, pp. 43–54.

Bantz, "Some Reminiscences of Wireless LAN in the early 1990s", Dec. 2005 (unpublished), pp. 1–11.

Barry et al., "High–Speed Nondirective Optical Communication for Wireless Networks", IEEE Network Magazine, Nov. 1991, pp. 44–54.

Bass, Trends in Networking Presentation, Proceedings of the IEEE Workshop on Wireless Local Area Networks, May 10, 1991, pp. 35–41.

Bello, "A Troposcatter Channel Model," IEEE Transactions on Communications, vol. 17, Apr. 1969, pp. 130–137.

Bello, "Selective Fading Limitations of the Kathryn Modem and Some System Design Considerations", IEEE Transactions on Communication Technology, COM–13, Sep. 1965, pp. 327–341.

Bic et al., "Elements of Digital Communication", John Wiley & Sons, 1991, pp. 1–216, France.

Biglieri et al., "Introduction to Trellis–Coded Modulation with Applications", Macmillan Publishing Co., 1991, pp. 1–295.

Biglieri, "High Level Modulation and Coding for Nonlinear Satellite Channels", IEEE Transactions on Communications, vol. COM–32, No. 5, May 1984, pp. 616–626.

Bingham, "Multicarrier Modulation for Data Transmission: An Idea Whose Time Has Come", IEEE Communications Magazine, May 7, 1990, pp. 5–14.

Blankenhorn Telebit launches 70,000 bps analog modem—WorldBlazer—product announcement, Apr. 14, 1992.

Bourin, "Hiperlan—markets and applications standardization issues", IEEE 1995 PIMRC Conference.

Brayer et al., "Evaluation of Error Correction Block Encoding for High Speed HF Data", IEEE Transaction on Communications Technology, COM–15, Jun. 1967, pp. 371–382.

Brayer, "The Improvement of Digital HF Communication Through Coding: I—Interleaved Cyclic Coding", IEEE Transaction on Communications Technology, COM–16, No. 6, Dec. 1968, pp. 771–778.

Buchholz et. al., "Wireless In–Building Network Architecture and Protocols", IEEE Network Magazine at 31, Nov. 1991.

Calderbank et al., "A New Description of Trellis Codes", IEEE Transactions on Information Theory, vol. IT–30, No. 6, Nov. 1984, pp. 784–791.

Casas et al., "OFDM for Data Communication Over Mobile Radio FM Channels—Part I: Analysis and Experimental Results", IEEE Transactions or Communications, vol. 39, No. 5, May 1991.

Casas, "OFDM/FM Mobile Radio Data Communication", Ph.D. Dissertation, University of British Columbia, Sep. 1989.

Chang et al., "A Theoretical Study of Performance of an Orthogonal Multiplexing Data Transmission Scheme", IEEE Transactions on Communication Technology, vol. COM–16, No. 4, Aug. 1968, pp. 529–540.

Chang, "Synthesis of Band–Limited Orthogonal Signals for Multichannel Data Transmission", Bell System Technical Journal, vol. 45, Dec. 1966, pp. 1776–1797.

Chase, "A Combined Coding and Modulation Approach for Communication over Dispersive Channels", IEEE Transactions on Communications, vol. COM–21, No. 3, Mar. 1973, pp. 159–174.

Cheah, "Interference of Microwave Ovens in Indoor Radio Communications", included in IEEE Workshop on Wireless Local Area Networks, Worcester Polytechnic Institute, May 9–10, 1991.

Chini et. al., "Multicarrier Modulation for Indoor Wireless Communications", Proceedings of ICUPC '93, 1993, pp. 674–678.

Chow et al., "A Computationally Efficient Adaptive Transceiver for High–Speed Digital Subscriber Lines", ICC 1990, Apr. 1990, pp. 1750–1754.

Chow et al., "A Cost–Effective Maximum Likelihood Receiver for Multicarrier Systems", IEEE International Conference on Communications, vol. 2, Jun. 1992, pp. 948–952.

Chow et al., "A Discrete Multitone Transceiver System for HDSL Applications", IEEE Journal On Selected Areas In Communications. vol. 9, No. 6, Aug. 1991.

Chuang, "The Effects of Delay Spread on 2–PSK, 4–PSK and 16–QAM in a Portable Radio Environment", GLOBECOM '87, pp. 807–810, Nov. 15–18, 1987.

Chuang, "The Effects of Multipath Delay Spread on Timing Recovery, IEEE Transactions on Vehicular Technology", vol. VT–35, No. 3, Aug. 1987, pp. 135–140.

Chuang, "The Effects of Time–Delay Spread on QAM with Nonlinearly Switched Filters in a Portable Radio Communications Channel", Bell Communications Research.

Cimini, "Analysis and Simulation of a Digital Mobile Channel Using Orthogonal Frequency Division Multiplexing", IEEE Transactions on Communication Technology, vol. COM–33, No. 7, Jul. 1995, pp. 665–675.

Cook et al., "Trellis–Coded Modulation for HF Sixteen Tone Modems", Proc 2nd UK–CIS International Symposium on Communications Theory and Applications, Lake District, UK, Jul. 1993, pp. 282–289.

Cook et al., "Error–Control Options for Parallel–Tone HF Modems", IEEE, 1993, pp. 933–938.

Cookley et al., Proposal for Extended Data Rate 802.11a, draft proposal, IEEE 802.11–02/231r0, Mar. 2002, pp. 1–5.

Daimler Benz, COFDM Presentation to Hiperlan, ETSI STC RES–10, pp. 1–15.

Dastangoo et al., "Wireless LAN Technologies and Applications," Military Communication Conference, 1993, pp. 497–501.

Proakis, Digital Communications, Second Edition (1989) (excerpt), 67 pages.

Zogakis et al., "Impulse Noise Mitigation Strategies for Multicarrier Modulation", IEEE International Conference on Communications, vol. 2, May 1993, pp. 784–788.

Zimmerman et al., "The AN/GSC–10 (Kathryn) Variable Rate Data Modem for HF Radio", IEEE Transactions on Communication Technology, COM–15, No. 2, Apr. 1967, pp. 197–204.

Yamane et al., (Matsushita), "Error Rate Performance of High Speed Indoor Digital Transmission Using Multicarrier Modulation Technique", IEICE Technical Report, vol. 91 No. 239, Sep. 1991, pp. 1–15 (with English Translation).

Yamane, "Research on An Indoor High–speed Wireless Data Transmission System Using Multi–Carrier Modulation" 1990 Special Research Report Contents Summary, Communications Engineering Department, pp. 1–42.

Xue et al., "Air Interface Considerations for Wireless LANs", Radio Relay Systems, Oct. 11–14, 1993, pp. 44–50.

Xu et al., "An Improved Bound for Non–Binary Trellis–Coded Communications Systems with Non–Uniform Sources", Proceedings of the 4th IASTED International Multi–Conference Wireless and Optical Communications, Jul. 8–10, 2004, pp. 380–386, Banff, Canada.

Woerner and Stark, "Performance of Trellis–Coded Direct–Sequence Spread–Spectrum Communications", IEEE 1990, EECS Dept., Univ. of Michigan, 1990, pp. 137–140.

Winters, "Optimum Combining in Digital Mobile Radio with Cochannel Interference", IEEE Journal on Selected Areas in Communications, vol. SAC–2, No. 4, Jul. 1984, pp. 528–539.

Wilkus et al., "Standards and Regulatory Aspects of Wireless Local Communications", Proceedings of IEEE Workshop on Wireless Local Area Networks, May 9–10, 1991, pp. 23–33.

Wilkinson, Johnson, Barton & Black, "A New Transmission/Resource Sharing Scheme for Radio LANs", ETSI RES10R Meeting, Nov. 13, 1992, pp. 1–12.

Department of Defense Interface Standard—Interoperability and Performance Standards for Data Modems Mar. 9, 2000, pp. 1–132.

Despins et al., "Equalization, Diversity, and Coding for Wideband TDMA Indoor Wireless Channels", May 9–10, 1991, pp. 123–126.

Devasirvatham et al., "Multi–Frequency Radiowave Propagation Measurements in the Portable Radio Environment", Apr. 16–19, 1990, pp. 65–72.

Devasirvatham, "A Comparison of Time Delay Spread and Signal Level Measurements within Two Dissimilar Office Buildings", IEEE Transactions on Antennas and Propagation, vol. AP–35, No. 2, Mar. 1987, pp. 319–324.

Devasirvatham, "Multipath Time Delay Spread in the Digital Portable Radio Environment", IEEE Communications Magazine, vol. 25, No. 6, Jun. 1987, pp. 13–21.

Devasirvatham, "Radio Propagation Studies in a Small City for Universal Portable Communications", Bell Communications Research, Sep. 1988, pp. 100–104.

Devasirvatham, "Time Delay Spread and Signal Level Measurements of 850 MHz Radio Waves in Building Environments", IEEE Transactions on Antennas and Propagation, vol. AP–34, No. 11 Nov. 1986, pp. 1300–1305.

Divsalar et al., "Trellis Coded Modulation for 4800 to 9600 bps Transmission Over a Fading Mobile Satellite Channel", JPL Publication 86–8, MSAT–X Report 129, Jun. 1, 1986, pp. 1–46.

Doelz et al., "Binary Data Transmission Techniques for Linear Systems", Proceedings of the IRE, vol. 45, May 1957, pp. 656–661.

Driessen, "Modulation Techniques for High–Speed Wireless Indoor Systems Using Narrowbeam Antennas", IEEE Transactions on Communications, vol. 43, No. 10, Oct. 1995, pp. 2605–2612.

EBU Guiding Principles: Satellite Sound Broadcasting in the Frequency Range 0.5 to 2 GHz, Collected Papers on Concepts for Sound Broadcasting into the 21st Century, Aug. 1988, 13 pages.

Elias, Coding for Noisy Channels, IRE Conv. Record, Part 4, 1955, pp. 37–46.

Falsafi et al., "Transmission Techniques for Radio LANs—A comparative Performance Evaluation Using Ray Tracing", IEEE Journal on Selected Areas in Communications, Apr. 1996, pp. 477–491.

FCC 96–193, ET Docket 960–102, RM–8648, RM–8653, Amendment of the Commission's Rules to Provide for Unlicensed NII/SUPERNet Operations in the 5 GHz Frequency Range (Release date: May 6, 1996), pp. 1–33.

FCC DC95–25, ET Docket No. 94–32, Commission Allocates Spectrum Below 5 GHz Transferred from Federal Government to Private Sector Use, Feb. 7, 1995, pp. 1–2.

Flying Fox—IBM/CSIRO very high performance radio: High level design document, Dec. 4, 1992, pp. 1–9.

Forney et al., "Efficient Modulation for Band Limited Channels, IEEE Journal on Selected Areas in Communications", vol. SAC–2, No. 5, Sep. 1984, pp. 632–647.

Fung, "Bit Error Simulation for /4 DQPSK Mobile Radio Communications using Two–Ray and Measurement–Based Impulse Response Models", IEEE Journal on Selected Areas in Communications, vol. II, No. 3, Apr. 1993, pp. 393–405.

Gast, 802.11 Wireless Networks—The Definitive Guide, 2nd Ed., 2005, 5 pages.

Geier, Wireless LANs, MacMillan, 1999, pp. 1–204—Part 1 of 2.

Geier, Wireless LANs, MacMillan, 1999, pp. 205–409—Part 2 of 2.

Gfeller et al., "Wireless In–House Data Communication via Diffuse Infrared Radiation," Proc. IEEE, vol. 67, Nov. 1979, pp. 1471–1486.

Gibson, Ed., The Communications Handbook, CRC Press, Chapter 84, 1997, 17 pages.

Goodwin et al.,"The Design and Simulation of an Adaptive HF Data Network, HF Radio Systems and Techniques", Fourth International Conference on HF Radio Systems and Techniques, Apr. 1988, pp. 1–5.

Gorman et al., An HF Packet Network for the Southern European Task Force, Military Communications Conference, IEEE, Oct. 1992, pp. 291–293.

Gray et al., "Recent Development in High Speed HF Data Communication", IEEE International Communications Conference (ICC) 1967, Minneapolis, Minnesota, Jun. 1967, 1 page.

Hagenauer et al., "Forward Error Correction Coding for Fading Compensation in Mobile Satellite Channels", IEEE JSAC, SAC–5, No. 2, Feb. 1987, pp. 215–225.

Halls, "Hiperlan—the 20 MBITS/S Radio LAN," The Institution of Electrical Engineers, London, 1995, IEE Colloquium on Radio LANs and MANs, Apr. 1995, pp. 1–8.

Halls, "Modelling the Hiperlan Radio Channel, Wireless Networks—Catching the Mobile Future", 5th IEEE International Symposium on personal, Indoor and Mobile Radio Communications, vol. 3, pp. 954–958, Sep. 1994.

Hanna et al., "Simulated Performance of Coded Digital Transmission in a Multi–User Indoor Radio Communication Environment", IEEE, 1991, pp. 235–239.

Hanna, "Convolutional Interleaving", IEEE, 1993, pp. 443–447.

Hanzo, "Adaptive Coding and Transmission Paradigms for Wireless Channels", 2002, pp. 1–8.

Hao et al., "Rate Variable COFDM–System with a Correction Block Against Channel Interferences", IEEE International Workshop on Intelligent Signal Processing and Communication System, Mar. 1992, pp. 84–93.

Hara et al., "Multicarrier Modulation Technique for Wireless Local Area Networks," Radio Relay Systems Conference, Oct. 1993, pp. 33–38.

Harris et al., "Use of Ale and Packet Radio for HF Networks", Tactical Communications Conference, 1990. vol. 1. Tactical Communications. 'Challenges of the 1990's', Apr. 24, 1990, pp. 397–413.

Harris et al., "Adaptive Data Communication Techniques for HF Systems", Proceedings of the Military Communications Conference, IEEE, vol. 1, Oct. 1993, pp. 57–61.

Harris—HF Modem Capability Matrix (Harris), 1 page.

Harris, RF–5022R/T(E) Receiver–Transmitter—Intermediate Maintenance Manual, Jan. 2000, pp. 1–240.

Harris, The Encryption Interface Kit, Including RF–5466 Multi–Waveform HF Modem Battery Eliminator, Shock Mount 4 Interconnect Cables—Installation and Operation Manual, Jan. 1990, pp. 1–238.

Harris Corporation, Radio Communications in the Digital Age—vol. 1: HF Technology, May 1996, pp. 1–53.

Harris Corporation, Weston, Auto Internetworking & HF Radio Links, 1994, pp. 305–309.

Harris develops secure fax system—Harris RF Communications Group 0 Briefs, BNET, Access Intelligence, LLC, Apr. 1991, pp. 1–2.

Harris HF Modem Comparison Test Report, Query, May 1986, pp. 1–120.

Harris RF–3466 & other modems, Abstract, Mar. 1986, one page.

Harris RF–3466 HF Data Modem, Jul. 1990, one page.

Harris RF–3466 HF Highspeed Data Modem, pp. 1–6, Nov. 1989.

Harris RF–3466 High Speed HF Data Modem [Rev. C 1MT], 1985, 2 pages.

Harris RF–3466 High Speed HF Modem, Installation and Operation Manual, Dec. 1984, pp. 1–144.

Harris RF–3466A Radio Modem Datasheet, HF–3466A Radio Modem MD–5063A (V)2/U, Apr. 26, 1999, pp. 1–6.

Harris RF–3466A Universal HF Modem [2M–T], 1986, pp. 1–4.

Harris RF–3466A Universal HF Modem [Rev. B 3M–T], Oct. 1989, pp. 1–4.

Harris RF–3466A Universal HF Modem [Rev. C 1M MR], Jul. 1991, pp. 1–4.

Harris RF–3466A Universal HF Modem Installation and Operation Manual, Publication No. 10133–3020, Oct. 1988, pp. 1–280.

Harris RF–3466T High–Speed Tactical HF Data Modem [Rev.B 1MT], Sep. 1985, 2 pages.

Harris RF–5000 Digital HF Tactical Communication System Manual, Oct. 1989, pp. 1–224.

Harris RF–5000 Series Digital HF Communications System (1990), pp. 1–10, 1990.

Harris RF–5000PA–125 125 Watt HF Power Amplifier [Rev A. 1MT], Oct. 1987, 2 pages.

Harris RF–5000RT Universal HF Receiver–Transmitter [Rev. A 1MT], Oct. 1987, pp. 1–3.

Harris RF–5020 Maintenance Manual A5 RF–5121 Automatic Link Establishment (ALE) Option, pp. 1–228.

Harris RF–5020 RT Maintenance Manual Publication No. 10181–0033, Oct. 1991, pp. 1–270.

Harris RF–5022RT Universal HF Receiver–Transmitter [5M MR], 1993, 2 pages.

Harris FR–5110MD High–Speed Data Modem Option [Rev. A 3M MR], Sep. 1991, 2 pages.

Harris RF–5110MD High–Speed Data Modem Option [Rev. B 1M PR–EG], Dec. 1993, 2 pages.

Harris RF–5122ALE Automatic Link Establishment Option [Rev. 5M MR], Sep. 1991, 2 pages.

Harris RF–5131LPC Voice Processor [Rev. 4M MR], Sep. 1991, 2 pages.

Harris RF–5142FH Frequency–Hopping and Digitized Voice Option [Rev. A 3M PR–EG], 1 page.

Harris RF–5254C Serial HF Modem [Rev. 3M T], Mar. 1990, 2 pages.

Harris RF–5710 Series High–Performance HF Data Modems, Jul. 1994, 1 page.

Hashemi, "The Indoor Radio Propagation Channel", Proceedings of the IEEE, vol. 81, 1993, pp. 943–968.

Hashemi, "Impulse Response Modeling of Indoor Radio Propagation Channels", IEEE Journal on Selected Areas in Communications, vol. II, No. 7, Sep. 1993, pp. 967–978.

Haykin, Communications Systems, Second Edition, 1983, pp. 1–34.

Heald et al., "A Predicted Wave–Signalling Phase–Shift Telegraph System", AIEE Transactions (Electrical Engineering), vol. 76, Part 1, Jul. 1957, pp. 316–319.

Heatley et al., "Optical Wireless: The Story So Far", IEEE Communications Magazine, Dec. 1998, pp. 72–82.

Helard et al., "Trellis Coded Orthogonal Frequency Division Multiplexing for Digital Video Transmission", Globecom Proceedings, 1991, pp. 785–791.

Hirosake, "An Orthogonally multiplexed QAM System Using Discrete Fourier Transform", IEEE Transactions on Communication Technology, vol. COM–28, No. 7, Jul. 1981, pp. 982–989.

Ho et al., "Effect of Antenna Polarization and Beam Pattern on Multipath Delay Spread and Path Loss in Indoor Obstructed Wireless Channels", Mobile and Portable Radio Research Group, 1992, pp. 92–96.

Hoeher, "TCM on Frequency–Selective Land–Mobile Fading Channels", 5th Tirrenia International Workshop on Digital Communications, Sep. 1991, pp. 1–12.

Hollemans and Verschoor, "Performance Study of Wave-LAN and Altair Radio–LANS, Personal, Indoor and Mobile Radio Communications", Wireless Networks—Catching the Mobile Future, 5th IEEE International Symposium, vol. 3, Sep. 18–23, 1994, pp. 831–837.

Hughes Aircraft Company, Enhanced Position Location Reporting System (EPLRS) Technical Description, May 25, 1988, pp. 1–11.

IEEE P802.11 Working Group tentative minutes (Monday, Nov. 11, 1991), pp. 1–38.

IEEE Richard W. Hamming Medal Recipients from IEEE Website, 5 pages, 2008.

ITU: Liason Statement to Working Party 3M, Nov. 9, 1998, pp. 288–296.

ITU–R P. 1238–5, Propagation data and prediction methods, pp. 1–18.

Jackson, Classical Electrodynamics, John Wiley and Sons, 1962, 4 pages.

Johnson et al., "Standards for Wireless LANs", IEE Colloquium on Wireless Technology, Nov. 1996, pp. 5/1 and 5/5.

Kobayashi et al. (Toshiba), Wireless LAN—Its Technical Issues and Prospects, IEICE Technical Report, vol. 92 No. 15, Apr. 1992, pp. 1–28.

Kruys, Hiperlan, Applications and Requirements, IEEE Int'l Symposium on Personal, Indoor and Mobile Radio Communications, Oct. 19–21, 1992, pp. 133–138.

Langton, Trellis Coded Modulation Tutorial, www.complextoreal.com, 2004.

Le Floch et al., "Digital Sound Broadcasting to Mobile Receivers", IEEE Transactions on Consumer Electronics, vol. 35, No. 3, Aug. 1989, pp. 493–503.

Lee et al., "TCM, TTCM, BICM and Iterative BICM Assisted OFDM–Based Digital Video Broadcasting to Mobile Receivers", VTC'01, 2001, pp. 732–736.

Le–Ngoc, "A CSMA/CD Portable Data System Using Adaptive Reed–Solomon Coding", 42nd VTS Conference, vol. 2, May 1992, pp. 819–822.

Li et al., "Comparison of TCM and BICM in Wireless LAN System Over Indoor Wireless Channel", ICCS 2002, 2002, pp. 299–303.

Li et al, "Study of Air Interface Techniques for Wireless LANs", Cordless Office, IEEE Colloquium on Cordless and portable computing in a wireless office environment, Oct. 1993, pp. 4/1 to 4/7.

Li, et al., "Analysis of Intermodulation Distortion Specification for Radio LANs Using Multicarrier Schemes," Electronic Letters, Jun. 1993, pp. 1229–1231.

Lipoff, "Implementation Issues for Wireless Spread Spectrum Data Communications Links for use in License Free Applications", IEEE Workshop on Wireless Local Area Networks, included in IEEE Workshop on Wireless Local Area Networks, Worcester Polytechnic Institute, May 9–10, 1991, pp. 2–16.

Lucky, "Automatic equalization for digital communication," Bell System Technical Journal, Apr. 1965, pp. 517–588.

Luhowy, "Advances in HF Parallel Tone Modem Technology", Proceedings of the 1988 Military Communications Conference, Oct. 23–26, 1988, pp. 4.1.1 to 4.1.5.

Massey, "Coding and Modulation in Digital Communications", Proceedings of the 1974 International Zurich Seminar on Digital Communications, Zurich, Switzerland, Mar. 1974, pp. E2(1)–E2(4).

Matthews et al., "Creating and Exploiting Intangible Networks: How Radiata Was Able to Improve its Odds of Success in the Risky of Innovating", Nov. 2003, pp. 1–31.

Maynard, Electronics Technician, vol. 3, Chapter 4: The Link–11 System, Naval Education and Training Professional Development Center, 1997, pp. 4–1 to 4–19.

McDonnell et al., "Comparison of Computational Complexity of Adaptive Equalization and OFDM for Indoor Wireless Networks", IEEE, 1996, pp. 1088–1091.

Michelson et al., "Applications of Error Control Coding", Error Control Techniques for Digital Communication, Chapter 11, pp. 372–414, John Wiley & Sons, Inc., 1985.

Military Standard–188–212 TADIL B and Standardization Agreement 5511, Annex B, Link 11B Waveform Conformance Test Procedures, Sep. 2003, pp. 1–159.

MIL–STD 188–110A, Interoperability and Performance Standards for Data Modems, Sep. 30, 1991, pp. 24–35.

MIL–STD–188–110A, Department of Defense Interface Standard—Interoperability and Performance Standards for Data Modems, Sep. 30, 1991, pp. 1–83.

MIL–STD–188–203–1A—TADIL A and Standardization Agreement, 5511, Annex B, Link 11 Conformance Test Procedures, Sep. 2003, pp. 1–87.

MIL–STD–188–203–1A, Interoperability and Performance Standards for Tactical Digital Information Link, Jan. 8, 1988, pp. 1–100.

Mitzlaff, "Radio Propagation and Anti–Multipath Techniques in the WIN Environment", IEEE Network Magazine, Nov. 1991, pp. 21–26.

Moller, Digital Terrestrial Television, The 8k System, EBU Technical Review, Winter, 1995, pp. 40–50.

Monsen, "Feedback Equalization for Fading Dispersive Channels," IEEE Transactions on Information Theory, vol. 17, Jan. 1971, pp. 56–64.

Morris et al., "Utilizing D–OFDM to Combat the Characteristics of the Broadband Indoor Radio Channel", BNR/Univ. of Calgary/TRLabs, pp. 194–210.

Morris, "Optimization of a Broadband Modulation Scheme for the Indoor Radio Channel", Department of Electrical and Computer Engineering, University of Calgary, Sep. 1993, pp. 1–137.

Mosier et al., "Kineplex, A Bandwidth–Efficient Binary Transmission System", Transactions of the American Institute of Electrical Engineers, Part 1: Communications and Electronics, vol. 76, pp. 723–728, Jan. 1958.

Natarajan et al., "Considerations for the Design of High–Speed Wireless Optical Networks", IBM Research, pp. 140–145.

Newhall et al., "Propagation Time Delay Spread Measurements at 915 MHz in a Large Train Yard", IEEE, pp. 864–868, 1996.

Ng et al., "Comparative Study of TCM, TTCM, BICM and BICM–ID Schemes", VTC'01, IEEE, 2001, pp. 2450–2454.

Nourry,"An Adaptive, Packet–Switched HF Data Terminal–Functional Overview and Initial Performance", CRC Report No. 1423, Communications Research Centre, Ottawa, Canada, Jul. 1991, pp. 1–55.

O'Hare et al., The IEEE 802.11 Handbook: A Designer's Companion, Second Edition, IEEE Press, 2005, pp. 1–390.

Okada et al., "High–Speed Indoor Digital Transmission Using Multicarrier Modulation", Institute of Electronics and Information and Communications Engineers, 1991 National Spring Convention, with certificate of translation, pp. 1–2.

Okada et al., "Wideband Indoor Radio System Using Orthogonal Multicarrier Modulation", Systems Engineering, IEEE Int'l Conference, 1992, pp. 457–462.

Okrah, "Multichannel Modulation as a Technique to Combat Fading in Radio Channels", Dissertation, Stanford University, Jun. 1992, pp. 1–106.

O'Leary, "Terrestrial Digital Audio Broadcasting in Europe", EBU Technical Review, Spring, 1993, pp. 19–26.

Ostergaard, "Short Range Commuication Systems, Design and Operation at Very High Latitudes", Fourth International Conference on HF Radio Systems and Techniques, Apr. 11, 1988, pp. 177–181.

Pahlavan et al., "Voice–Band Data Communication Modems—A Historical Review: 1919–1988", IEEE Communications Magazine, vol. 26, No. 1, Jan. 1988, pp. 16–27.

Pahlavan, "Wireless Intraoffice Networks", ACM Transactions on Office Information Systems, vol. 6, No. 3, Jul. 1988, pp. 277–302.

Pennington, "Techniques for Medium–Speed Data Transmission Over HF Channels", IEE Proceedings, vol. 136, Pt. I, No. 1, Feb. 1989, pp. 11–19.

Pommier et al., "New Prospects for High–Quality Digital Sounds Broadcasting to Mobile, Portable and Fixed Radio Receivers", International Broadcasting Convention, Sep. 1988, pp.349–353.

Porter, "Error Distribution and Diversity Performance of a Frequency–Differential PSK HF Modem", IEEE Transactions on Communication Technology, vol. COM–16, No. 4, Aug. 1968, pp. 567–575.

Powers et al., "A Digital Implementation of a Multichannel Data Modem", Proceedings of the 1968 IEEE ICC, Jun. 1968, pp. 706–711.

Rappaport, "Charaterization of UHF Multipath Radio Channels in Factory Buildings", IEEE Transactions on Antennas and Propagation, vol. 37, No. 8, Aug. 1989, pp. 1058–1069.

Rappaport, "Characterizing the UHF Factory Multipath Channel", Purdue University Thesis, Dec. 1987, pp. 1–8.

Rappaport, "Delay Spread and Time Delay Jitter for the UHF Factory Multipath Channel", IEEE, 1988, pp. 186–189.

Rappaport, "Indoor Radio Communications for Factories of the Future", IEEE Communications Magazine, May 1989, pp. 15–24.

Rappaport, "Radio–Wave Propagation for Emerging Wireless Personal–Communication Systems", IEEE Antennas and Propagation Magazine, vol. 36, No. 5, Oct. 1994, pp. 14–24.

Rappaport, "UHF Multipath and Propagation Measurements in Manufacturing Environments", IEEE, 1988, pp. 825–831.

Presentation Materials from the IEEE Workshop on Wireless Local Area Networks, May 9–10, 1991, Worcester, MA, pp. ii–38—Part 1 of 4.

Presentation Materials from the IEEE Workshop on Wireless Local Areas Networks, May 9–10, 1991, Worcester, MA, pp. 39–84—Part 2 of 4.

Presentation Materials from the IEEE Workshop on Wireless Local Area Networks, May 9–10, 1991, Worcester, MA, pp. 138–145—Part 4 of 4.

Rappaport, Wireless Communications–Principles and Practice, pp. 1–641, 1996, Prentice Hall PTR, New Jersey, USA, pp. 00–220—Part 1 of 3.

Rappaport, Wireless Communications–Principles and Practice, pp. 1–641, 1996, Prentice Hall PTR, New Jersey, USA., pp. 221–450—Part 2 of 3.

Rappaport, Wireless Communications–Principles and Practice, pp. 1–641, 1996, Prentice Hall PTR, New Jersey, USA., pp. 451–645—Part 3 of 3.

N. Reid et al., 802.11 (Wi–Fi) Networking Handbook, pp. 1–363, 2003, McGraw–Hill/Osborne, pp. 00–111—Part 1 of 3.

N. Reid et al., 802.11 (Wi–Fi) Networking Handbook, pp. 1–363, 2003, McGraw–Hill/Osborne, pp. 112–229—Part 2 of 3.

N. Reid et al., 802.11 (Wi–Fi) Networking Handbook, pp. 1–363, 2003, McGraw–Hill/Osborne, pp. 230–365—Part 3 of 3.

Rault et al., "The Coded Orthogonal Frequency Division Multiplexing (COFDM) Techniques, and Its Application to Digital Radio Broadcasting Towards Mobile Receivers", IEEE, 1989, Nov. 27–30, 1989, pp. 428–432.

Reynolds, "Maritime Gateway: Extending Terrestrial Network Services Over Radio Links", Shape Technical Centre, The Netherlands, 1995, pp. 1–10.

Saleh et al., "A Statistical Model for Indoor Multipath Propagation", IEEE Journal on Selected Areas in Communications, vol. SAC–5, No. 2, Feb. 1987, pp. 128–137.

Saleh et al., "A TDMA Indoor Radio Communications System Using Cyclical Slow Frequency Hopping and Coding–Experimental Results and Implementation Issues", pp. 1337–1342.

Saltzberg, "Performance of an Efficient Parallel Data Transmission System", IEEE Transactions on Communication Technology, vol. COM–15, No. 6, pp. 805–811, Dec. 1967.

Scholtz, "The Origins of Spread–Spectrum Communications", IEEE Transactions on Communications, vol. COM–30, No. 5, May 5, 1982, pp. 822–854.

Seidel et al., "The Impact of Surrounding Building on Propagation for Wireless In–Building Personal Communications System Design", IEEE, 1992, pp. 814–818.

Sjoeberg, "ARTAC–An Automatic Adaptive HF Radio Syste in Field Tests", HF Radio Systems and Techniques, Fourth International Conference on HF Radio Systems and Techniques, Apr. 1988, pp. 86–89.

Skellern et al., "A mm–Wave High Speed Wireless LAN for Mobile Computing–Architecture and Prototype Modem/Codec Implementation", IEEE Hot Interconnects 96, Aug. 15–17, 1996, pp. 1–12.

Smith, "Automatically Controlled HF Radio–Systems–Towards Standardization", HF Radio Systems and Techniques, Fifth International Conference on HF Radio Systems and Techniques, Jul. 1991, pp. 1–6.

Smulders et al., "Wideband Indoor Radio Propagation Measurements at 58 GHz", Electronics Letters, vol. 28, No. 13, Jun. 18, 1992, pp. 1270–1272.

Stott, "The How and Why of COFDM", BBC Research and Development, EBU Technical Review, Winter, 1998, pp. 1–14.

Sun et al., "A Simulation of Combined Equalisation and Diversity Combining and its Impact on the Hiperlan Standard", The Institution of Electrical Engineers, 1995, pp. 7/1 to 7/7.

Talbot, Field Test Results of the ANDEFT/SC–320 4800 bps HF Modem, The MITRE Corp., Cambridge, Mass., Tech Report ESD–TR–68–117, Apr. 1968, pp. 1–248.

A.A. Reiter et al., "Data on the Go: Three Cellular Modems", PC Magazine, Dec. 25, 1990, pp. 365–382.

Telebit—Eagle Cross: Cellular Combos Differ in Heft, Abilities, PC Week, vol. 8, No. 42, Oct. 21, 1991, pp. 161–164.

Telebit—MV Communications Newsletter: Jun. 1992, MV Communications, Inc., Manchester, New Hampshire, pp. 1–3.

Telebit Introduces Worldblazer Modem, New Release Apr. 13, 1992, Westlaw, pp. 1–3.

Telebit PEP Modem Consideration For Adverse Communications Links, Revision 1.00, Sep. 1, 1990, pp. 1–6.

Telebit Product Announcement, Launches 70,000 bps Modem, Apr. 14, 1992, one page.

Telebit Quarterly Report to Shareholders (Dec. 31, 1987), 2 pages.

Telebit Standalone WorldBlazer Modem User's Guide, 90257–01, copyright 1992, pp. 1–12.

Telia Research AB, "Suggestion for the study of COFDM techniques for Hiperlan", ETSI RES10–92/13 Feb. 28, 1992, pp. 1–12.

Terry et al, OFDM Wireless LANS: A Theoretical and Practical Guide, 2002, Sams Publishing, Indianapolis, Indiana, USA (title, copyright pages and p. 118).

Tuch, An Engineers Story of WaveLAN, NCR Corporation, pp. 11.1 to 11.12.

Tuch, An ISM Band Spread Spectrum Local Area Network: WaveLAN, pp. 103–111.

Tuch, "Development of WaveLAN and ISM Band Wireless LAN," AT&T Technical Journal, Jul./Aug. 1993, 103–111.

Tzannes et al., Extended Data Rate 802.11a, Mar. 2002 draft proposal, IEEE 802.11–01/232r0, pp. 1–9.

Wilkinson et al., "A Report on Hiperlan Standardization," International Journal of Wireless Information Networks, vol. 2, No. 2, Apr. 1995, pp. 99–120.

Ungerboeck et al., On Improving Data Link Performance by Increasing the Channel–Alphabet and Introducing Sequence Coding, International Symposium on Information Theory, Ronneby, Sweden, Jun. 1976, pp. 1–4.

Ungerboeck, Channel Coding with Multilevel/Phase Signals, IEEE Transactions on Information Theory vol. IT–28, No. 1, Jan. 1982, pp. 55–67.

Ungerboeck, Trelis–Coded Modulation with Redundant Signal Sets, Part 1: Introduction, IEEE Communications Magazine, vol. 25, No. 2, Feb. 1987, pp. 5–11.

Ungerboeck, Trellis–Coded Modulation with Redundant Signal Sets, Part 2: State of the Art, IEEE Communications Magazine, vol. 25, No. 2, Feb. 1987, pp. 12–21.

Untitled document which begins, The standards for communications in the United States Navy over a computer–to–computer radio data link are set forth in military standared MIL–STD–188–203 dated Jan. 8, 1988, 2 pages.

Van De Laar, General–Purpose and Application–Specific Design of a DAB channel Decoder, EBU Technical Review, 1993, pp. 25–35.

Viterbi, Error Bounds for Convolutional Codes and an Asymptotically Optimum Decoding Algorithm, IEEE Transactions on Information Theory, IT–13, No. 2, Apr. 1967, pp. 260–269.

Weinstein et al., Data Transmission by Frequency –Division Multiplexing Using the Discrete Fourier Transform, IEEE Transactions on Communication Technology, vol. COM–19, Oct. 1971, pp. 628–634.

Weston, "Automated Internetworking Using HF Radio Links", HF Radio Systems and Techniques, Conference Publication No. 392, Jul. 1994, pp. 305–309.

Wicker, "Reed–Solomon Error Control Coding for Rayleigh Fading Channels with Feedback", IEEE Transactions on Vehicular Technology, vol. 41, No. 2, May 1992, pp. 124–133.

Wilkinson et al., "Speed Spectrum for Radio LANS", IEEE Colloquium on Radio LANS, May 7, 1992, pp. 6/1 to 6/4.

Wilkinson et al., COFDM for Hiperlan, RES–10R(92)13; ETSI RES10R Sophia Antipolis May 6–7, 1992, T. A. Wilkinson, S. K. Barton, S. A. Black, 2 pages.

Wilkinson et al., "Multicarrier Transmission Schemes for Hiperlan: Part 1: A New Transmission / Resource Sharing Scheme for Radio LANs", European Cooperation in the Field of Scientific and Technical Research, Jan. 19–22, 1993, pp. 1–27.

Bahai, Multi–Carrier Digital Communications Theory and Application of OFDM, 2004, pp. 00–206—Part 1.

Bahai, Multi–Carrier Digital Communications Theory and Applications of OFDM, 2004, pp. 207–412—Part 2.

Bingham, "The Theory and Pratice of Modem Design", Wiley, 1988, pp. 145—Part 1 of 3.

Bingham, "The Theory and Practice of Modem Design", Wiley, 1988, pp. 128–292—Part 2 of 3.

Bingham, "The Theory and Pratice of Modem Design", Wiley, 1988, pp. 293–456—Part 3 of 3.

Blahut, "Theory and Practice of Error Control Codes", Reading: Addison–Wesley, 1983, pp. 1–501, pp. 1–238—Part 1 of 2.

Blahut, "Theory and Practice of Error Control Codes", Reading: Addison–Wesley, 1983, pp. 1–501, pp. 239–501—Part 2 of 2.

Freeburg, "Enabling Technologies for Wireless In–Building Network Communications—Four Techical Challenges, Four Solution," IEEE Communications Magazine, vol. 29, No. 4, 1991, pp. 58–64.

Heegard et al., Turbo Coding, Boston: Kluwer Academic Publishers, 1999, pp. 1–228.

InformationWeek, Feb. 26, 1996, p. 55, "The Price Of Freedom—Wireless LANs extend enterprise access, but the technology is expensive and slow.", pp. 1–3.

Keiser, Local Area Networks, Second Edition, McGraw–Hill, 2002, pp. 1–379, pp. 1–182—Part 1 of 2.

Keiser, Local Area Networks, Second Edition, McGraw–Hill, 2002, pp. 1–379, pp. 183–379—Part 2 of 2.

Kern et al., National Telecommunication Conference, New Orleans, pp. 28.15 to 28.19, (1975).

Lee, Mobile Cellular Telecommunications, McGraw Hill, 1995, pp. 1–666, pp. 1–217—Part 1 of 3.

Lee, Mobile Cellular Telecommunications, McGraw Hill, 1995, pp. 1–666, pp. 218–451—Part 2 of 3.

Lee, Mobile Cellular Telecommunications, McGraw Hill, 1995, pp. 1–666, pp. 452–666—Part 3 of 3.

Mathias, "Wireless LAN Tutorial: Products and Systems," available at http://www.cwins.wpi.edu, pp. 1–16.

Pahlavan et al., Wireless Information Networks (two editions, 1995 and 2005), Wiley–Interscience, pp. 1–284—Part 1 of 2.

Pahlavan et al., Wireless Information Networks (two editions, 1995 and 2005), Wiley–Interscience, pp. 285–572—Part 2 of 2.

Pahlavan et al., Wireless Information Networks (two editions, 1995 and 2005), Wiley–Interscience; pp. 1–24—Part 1 of 3.

Pahlavan et al., Wireless Information Networks (two editions, 1995 and 2005), Wiley–Interscience; pp. 242–492—Part 2 of 3.

Pahlavan et al., Wireless Information Networks (two editions, 1995 and 2005), Wiley–Interscience; pp. 493–726—Part 3 of 3.

Pahlavan et al., "Wireless Data Communications," Proceedings of the IEEE, vol. 82, No. 9, Sep. 1994, pp. 1398–1430.

Pahlavan et al., "Multipath Propagation Measurements on Manufacturing Floors at 910 MHz", IEE Electronics Letters, vol. 25, 1989, pp. 225–227.

Presentation materials from The Second IEEE Workshop on Wireless LANs, Worcester, MA, 1996, pp. 1–24.

Takahasi et al., "Optical Wireless Network for Office Communication", Jarect vol. 20, Telecommunication Technologies, 1985/1986, Ohmsha, Ltd. and North–Holland Publishing Co., pp. 217–228.

Van Huynh, Thesis: Wideband Digital Communication Over an Indoor Radio Channel, Apr. 1992, pp. 1–169, University of South Australia.

Wireless LANs: The Search For Indoor Plumbing, Network Computing, Dec. 15, 1995, pp. 1–3.

Tanenbaum, Computer Networks, Third Edition, Prentice Hall, 1996, pp. 1–280—Part 1 of 3.

Tanenbaum, Computer Networks, Third Edition, Prentice Hall, 1996; pp. 281–582—Part 2 of 3.

Tanenbaum, Computer Networks, Third Edition, Prentice Hall, 1996, pp. 583–815—Part 3 of 3.

Hanzo, OFDM and MC–CDMA for Broadband Multi–User Communications, WLANs and Broadcasting, 2003, pp. 1–217—Part 1 of 4.

Hanzo, OFDM and MC–CDMA for Broadband Multi–User Communications, WLANs and Broadcasting, 2003, pp. 218–541—Part 2 of 4.

Hanzo, OFDM and MC–CDMA for Broadband Multi–User Communications, WLANs and Broadcasting, 2003, pp. 542–804—Part 3 of 4.

Hanzo, OFDM and MC–CDMA for Broadband Multi–User Communications, WLANs and Broadcasting, 2003, pp. 805–980—Part 4 of 4.

Yamamura et al., "Interference Cancellation and Capacity of a Cellular CDMA System Based on Multihop Fast Frequency Hopping", IEEE 1991, pp. 71–76.

Electronics and Information Technology English–Japanese Dictionary, 1992, pp. 1–5.

Tuch, "An Engineer's Summary of an ISM Band Wireless Lan", IEEE 802.11 Committee, Jul. 1991, pp. 1–14.

Sato et al., A Study on a Channel Assignment Method for Multimedia Radio Communication Systems, Institute of Image Information and Television Engineers, ITBJ Technical Report, vol. 16, No. 17, Feb. 1992, pp. 7–12.

Kinugawa et al., "A Consideration on Local Area Radio Communication System", Institute of Image Information and Television Engineers, ITBJ Technical Report, vol. 16, No. 51, Aug. 1992, pp. 13–18.

Data Communication Terminology Dictionary, 1974, pp. 1–5.

Electronics Information Communication Terminology Dictionary, pp. 1–2.

Arnold et al., Wireless LANs a Portable Communications View, Bell Communications Research, pp. 1–15.

Barry et al., Simulation of Multipath Impulse Response for Indoor Wireless Optical Channels, IEEE Journal on Selected Areas in Communications, Apr. 1993, pp. 367–379, vol. 11, No. 3.

Despins et al., Compound Strategies of Coding, Equalization, and Space Diversity for Wide–Band TDMA Indoor Wireless Channels, IEEE Transactions on Vehicular Technology, Nov. 1992, pp. 369–379, vol. 41, No. 4.

Harris FR–5000 radio, pp. 1–13.

Harris RF–6710W Wireless Message Terminal Software, 4 pages.

IBM Web page—Underboeck Wins "Nobel Prize Communication", (http://domino.watson.ibm.com/comm/wwwr_thinkresearch.nsf/pages/honors296.html), pp. 103.

Kavehrad, Spread Spectrum PBX System Using CDMA, Published in Proceedings of the IEEE Workshop on Wireless Local Area Networks, May 1991, pp. 89–97, Worcester, MA.

Kenwood HF TS940S Transceiver Instruction Manual, pp. 1–62.

Lam et al., The Effect of Delay Spread on the BER Performance on Indoor Personal Communications Systems, Mobile Radio and Personal Communications, Fifth International Conference, Dec. 11–14, 1989, pp. 107–111, STC Technology.

LB Communications, Method for hardware implementation of a convolutional turbo code interleaver and a sub–block interleaver, pp. 1–10.

Marcus, Regulatory Policy Considerations for Radio Local Area Network, Published in Proceedings of the IEEE Workshop on Wireless Local Area Networks, Federal Communications Commission, May 1991, pp. 42–48.

Minutes of the ETSI Meeting RES 10S/R Radio Local Rea Network (untranslated), pp. 1–9.

Minutes of the ETSI Meeting RES 10S/R Radio Local Rea Network (with certificates of translation), pp. 1–10.

Motorola Altair, The Brightest Star in Wireless Network Communications Information, Motorola Inc., pp. 1–15.

Multi–Carrier Modulation Method (English translation), pp. 1–10.

Multi–Carrier Modulation Method (untranslated).

Nortel Networks, On the Algebraic Channel Interleaver Design, TSG–R1 3(99)249, pp. 1–13.

Pahlavan et al., "Time and Frequency Domain Models for Indoor Radio Propagation", National Science Foundation and Raytheon Company, pp. 73–80.

Pahlavan et al., "Performance of Spread Spectrum and Decision Feedback Equalizers Over Wideband Measurements of the Indoor Radio Channel", published in Proceedings of the IEEE Workshop on Wireless Local Area Networks, May 1991, pp. 112–115, Worcester, MA.

RES10–R Document List, 1992, one page.

Schilling et al., "Spectral Efficiency Using CDMA for Personal Communication Networks", pp. 98–102.

Synthesis, Link 11 Information Sheet, SyntheSys Systems Engineers Limited, one page.

Telebit—Circuit Board photo, one page.

Honeyman et al., The Little Work Project, Third Workshop on Workstation Operating Systems, Apr. 23–24, 1992, IEEE Computer Society.

Driessen, Gigabit/s Indoor Wireless Systems with Directional Antennas, IEEE Transactions on Communications, Aug. 1996, vol. 44, No. 8, pp. 1034–1043.

Driessen, 622 Mb/s Indoor Wireless Systems with Directional Antennas, AT&T Bell Laboratories, pp. 492–496.

Telebit—Eagle Cross Outback Datasheet, pp. 1–4.

Telebit—Product Ports photo, one page.

Vafi et al., Convolutional interleaver for unequal error protection of turbo codes, 2003, pp. 485–491.

Kenwood Trio HF TS440S Transceiver Instruction Manual, 1986, pp. 1–116, Japan.

Rault, J.C. et al., "The Coded Orthogonal Frequency Division Multiplexing (COFDM) Technique, and its Application to Digital Radio Broadcasting Towards Mobile Receivers", Receivers, Global Telecommunications Conference and Exhibition, Communications Technology for the 1990s and Beyond, GLOBECOM '89, IEEE 428–432, vol. 1, (Nov. 27–30, 1989).

Percival, T. et al., "Wireless Systems at High Bit Rates—Technical Challenges", Mobile and Personal Communications Systems, Proceedings of 57–66, (Nov. 12–13, 1992).

Telia Research AB, "Suggestion for the study of COFDM techniques for Hiperlan", ETSI RES–10 (Mar. 5–6, 1992).

Haykin, Simon, *Communication Systems*, Second Edition, (2nd ed. 1983).

Bic, J. C., *Elements of Digital Communication*, (1991).

Mitzlaff, J.E., "Radio Propagation and Anti–Multipath Techniques in the WIN Environment", 5 Network, IEEE 21–26, (Nov. 1991).

Wilkinson, T.A. et al., "Spread Spectrum for Radio LANs, in Radio LANs", IEEE Colloquium on 6/1–6/4, (May 7, 1992).

Bingham, J.A.C., "Multicarrier Modulation For Data Transmission: An Idea Whose Time Has Come", 28 Communications Magazine, IEEE 5–14, (May 1990).

Okada, M. et al., "Wideband Indoor Radio System Using Orthogonal Multicarrier Modulation", Systems Engineering, 1992, IEEE International Conference on 457–462, (Sep. 17–19, 1992).

* cited by examiner

US 5,487,069 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10-16, 26-32, 42-48, 56-60 and 68-72 is confirmed.

Claims 1-3, 17-19, 33-35, 49-51 and 61-63 are cancelled.

Claims 4, 6, 8, 9, 20, 22, 24, 25, 36, 38, 40, 41, 52, 54, 64 and 66 are determined to be patentable as amended.

Claims 5, 7, 21, 23, 37, 39, 53, 55, 65 and 67, dependent on an amended claim, are determined to be patentable.

New claims 73-152 are added and determined to be patentable.

4. A wireless LAN [as claimed in claim 3,] *comprising:*

*a plurality of hub transceivers coupled together to constitute a plurality of data sources and destinations; and*

*a plurality of mobile transceivers each coupled to data processing means and between each said data processing means and a corresponding said transceiver data passes to be transmitted or received, said transceivers being for data transceiving operation by radio transmissions to one of said hub receivers in a confined multipath environment, and each transceiver comprising:* antenna means coupled to transmission signal processing means and to reception signal processing means, said transmission signal processing means in turn coupled to an input data channel, and said reception signal processing means in turn coupled to an output data channel, each said transceiver being operable to transmit and receive data at radio frequencies in excess of 10 GHz, and said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths wherein said transmission signal processing means further comprises *means to provide data reliability enhancement to said input data passed to said modulation means wherein said data reliability enhancement is Forward Error Correction and* means, interposed between said data reliability enhancement means and said modulation means, for interleaving blocks of said input data.

6. A wireless LAN as claimed in claim [1] *4*, wherein said modulation means performs, for each said sub-channel, multi-level amplitude and/or phase modulation (mQAM).

8. A wireless LAN as claimed in claim [1] *4*, wherein said reception signal processing means comprises demodulation means for demodulating received symbols of said plurality of sub-channels into output data for said output data channel.

9. A wireless LAN as claimed in claim [1] *4*, further comprising switching means for selectively coupling said antenna means to said transmission signal processing means for transmission of data and to said reception signal processing means for reception of data.

20. A peer-to-peer wireless LAN [as claimed in claim 19,] *comprising:*

*a plurality of mobile transceivers for data transceiving operation by radio transmissions between ones thereof in a confined multipath environment, each said transceiver being coupled to a data processing means, and between each said data processing means and a corresponding said transceiver data passes to be transmitted or received, each said transceiver comprising:* antenna means coupled to transmission signal processing means and to reception signal processing means, said transmission signal processing means in turn coupled to an input data channel, and said reception signal processing means in turn coupled to an output data channel, each said transceiver being operable to transmit and receive data at radio frequencies in excess of 10 GHz, and said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths, wherein said transmission signal processing means further comprises *means to provide data reliability enhancement to said input data passed to said modulation means wherein said data reliability enhancement is Forward Error Correction and* means, interposed between said data reliability enhancement means and said modulation means, for interleaving blocks of said input data.

22. A peer-to-peer wireless LAN as claimed in claim [17] *20*, wherein said modulation means performs, for each said sub-channel, multi-level amplitude and/or phase modulation (mQAM).

24. A peer-to-peer wireless LAN as claimed in claim [17] *20*, wherein said reception signal processing means comprises demodulation means for demodulating received symbols of said plurality of sub-channels into output data for said output data channel.

25. A peer-to-peer wireless LAN as claimed in claim [17] *20*, further comprising switching means for selectively coupling said antenna means to said transmission signal processing means for transmission of data and to said reception signal processing means for reception of data.

36. A transceiver [as claimed in claim 35,] *for operation in a confined multipath transmission environment, said transceiver comprising antenna means coupled to transmission signal processing means and to reception signal processing means, said transmission signal processing means in turn coupled to an input data channel, and said reception signal processing means in turn coupled to an output data channel, said transceiver being operable to transmit and receive data at radio frequencies in excess of 10 GHz, and said transmission signal processing means comprising modulation means for modulating input data of said input data channel into a plurality of sub-channels comprised of a sequence of data symbols such that the period of a sub-channel symbol is longer than a predetermined period representative of the time delay of significant ones on non-direct transmission paths,* wherein said transmission signal processing means further comprises *means to provide data reliability enhancement to said input data passed to said modulation means wherein said data reliability enhancement is Forward Error Correction and* means, interposed between said input data reliability enhancement means and said modulation means, for interleaving blocks of said data.

38. A transceiver as claimed in claim [33] *36*, wherein said modulation means performs, for each said sub-channel, multi-level amplitude and/or phase modulation (mQAM).

40. A transceiver as claimed in claim [33] *36*, wherein said reception signal processing means comprises demodulation means for demodulating received symbols of said plurality of sub-channels into output data for said output data channel.

41. A transceiver as claimed in claim [33] *36*, further comprising switching means for selectively coupling said antenna means to said transmission signal processing means for transmission of data and to said reception signal processing means for reception of data.

52. A transmitter [as claimed in claim 51,] *for operation in a confined multipath transmission environment, said transmitter comprising antenna means coupled to transmission signal processing means in turn coupled to an input data channel, said transmitter being operable to transmit data at radio frequencies in excess of 10 GHz, and said transmission signal processing means comprising modulation means for modulating input data of said input data channel into a plurality of sub-channels comprised of a sequence of data symbols such that the period of a sub-channel symbol is longer than a predetermined period representative of the time delay of significant ones of non-direct transmission paths,* wherein said transmission signal processing means further comprises *means to provide data reliability enhancement to said data passed to said modulation means wherein said data reliability enhancement is Forward Error Correction and* means, interposed between said data reliability enhancement means and said modulation means, for interleaving blocks of said data.

54. A transmitter as claimed in claim [49] *52*, wherein said modulation means performs, for each said sub-channel, multi-level amplitude and/or phase modulation (mQAM).

64. A method [as claimed in claim 63, comprising the further step of] *for transmitting data in a confined multipath transmission environment at radio frequencies in excess of 10 GHz, said data being provided by an input data channel coupled to transmission signal processing means in turn coupled to antenna means, said method comprising the steps of:* modulating *said data, by modulation means of said transmission signal processing means,* into a plurality of sub-channels comprised of a sequence of data symbols such that the period of a sub-channel symbol is longer than a predetermined period representative of the time delay of significant ones of non-direct transmission paths; and transmitting, *by said antenna means,* said sub-channel symbols *at said radio frequencies in excess of 10 GHz,* providing data reliability enhancement to said data in advance of said modulation step wherein said data reliability enhancement is Forward Error Correction and, interleaving blocks of said input data between the steps of providing data reliability enhancement monitoring and step of modulation.

66. A method as claimed in claim [61] *64*, wherein said step of modulation is multi-level amplitude and/or phase modulation (mQAM).

73. *A transceiver as claimed in claim 42, wherein said means to apply data reliability enhancement is a convolutional encoder.*

74. *A transceiver as claimed in claim 73, wherein the convolutional encoder has a coding rate equal to ½.*

75. *A transceiver as claimed in claimed 73, wherein said means for interleaving interleaves a predetermined number of said blocks of said data within a frame, and wherein each frame of interleaved data is provided to said modulation means for transmission simultaneously across said plurality of sub-channels.*

76. *A transceiver as claimed in claim 75, wherein said blocks of said input data are bits.*

77. *A transceiver as claimed in claim 73, wherein said modulation means performs, for each said sub-channel, multi-level amplitude and/or phase modulation (mQAM).*

78. *A transceiver as claimed in claim 77, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).*

79. *A transceiver as claimed in claim 78, wherein said reception signal processing means comprises ensemble demodulation means for demodulating received symbols of said plurality of sub-channels into data for said output data channel.*

80. *A transceiver as claimed in claim 79, further comprising switching means for selectively coupling said antenna means to said transmission signal processing means for transmission of data and to said reception signal processing means for reception of data.*

81. *Transceiver as claimed in claim 42, wherein the transmission signal processing means further comprises a frame assembler coupled to said means for interleaving, and wherein said frame assembler assembles the interleaved blocks of data into a frame having zero padding.*

82. *A transceiver as claimed in claim 81, wherein the transmission signal processing means further comprises a synchronisation header generator that provide a header to said frame assembler.*

83. *A transceiver as claimed in claim 75, wherein said transmission signal processing means arranges a plurality of frames as a packet.*

84. *A transceiver as claimed in claim 83, wherein said packet has a variable duration less than or equal to a time period over which a transmission characteristic is essentially stationary.*

85. *A transceiver as claimed in claim 84, wherein a range over which said packet duration varies includes a duration of 100 microseconds.*

86. *A transceiver as claimed in claim 42, wherein said modulation means is a complex Fast Fourier Transform based modulator, executing an Inverse Fast Fourier Transform.*

87. *A transceiver as claimed in claim 86, further comprising a cyclic extender coupled to receive an FFT output frame resulting from said Inverse Fast Fourier Transform, wherein said cyclic extender produces a cyclic extension that is added to said FFT output frame.*

88. *A transceiver as claimed in claim 87, wherein said reception signal processing means comprises:*

*a FFT circuit demodulating received radio frequency signals into received data;*

*a deinterleaving circuit deinterleaving said received data into a data stream; and* a decoder circuit generating output data from said data stream to be provided to said output data channel.

89. A transceiver as claimed in claim 82, wherein said reception signal processing means comprises a synchronizing detection means that detects a header in received data.

90. A transceiver as claimed in claim 42, wherein said antenna means provides polarization diversity.

91. A transceiver as claimed in claim 42, wherein said means for interleaving interleaves a predetermined number of said blocks of said data within a frame, and wherein each frame of interleaved data is provided to said modulation means for transmission simultaneously across said plurality of sub-channels.

92. A transceiver as claimed 91, wherein said blocks of said input data are bits.

93. A transceiver as claimed in claim 91, wherein said transmission signal processing means arranges a plurality of frames as a packet.

94. A transceiver as claimed in claim 93, wherein said packet has a variable duration less than or equal to a time period over which a transmission characteristic is essentially stationary.

95. A transceiver as claimed in claim 94, wherein a range over which said packet duration varies includes a duration of 100 microseconds.

96. A transceiver as claimed in claim 42, wherein:
said means to apply data reliability enhancement is a convolutional encoder;
said means for interleaving interleaves a predetermined number of said blocks of said data within a frame, and wherein each frame of interleaved data is provided to said modulation means for transmission simultaneously across said plurality of sub-channels, and said blocks of said input data are bits;
said modulation means performs, for each said sub-channel, multi-level amplitude and/or phase modulation (mQAM) being one of: multi-level amplitude phase shift keying (mASK), permutation modulation, binary phase shift keying (BPSK), multi-level phase shift keying (mPSK) and multi-level amplitude phase keying (mAPK), and said modulation means is a complex Fast Fourier Transform based modulator, executing an Inverse Fast Fourier Transform;
said transmission signal processing means arranges a plurality of frames as a packet, and said packet has a variable duration less than or equal to a time period over which a transmission characteristic is essentially stationary; and
said reception signal processing means comprises:
a FFT circuit demodulating received radio frequency signals into received data;
a deinterleaving circuit deinterleaving said received data into a data stream; and
a decoder circuit generating output data from said data stream to be provided to said output data channel.

97. A transmitter as claimed in claim 56, wherein said means to apply data reliability enhancement is a convolutional encoder.

98. A transmitter as claimed in claim 97, wherein the convolutional encoder has a coding rate equal to ½.

99. A transmitter as claimed in claim 97, wherein said means for interleaving interleaves a predetermined number of said blocks of said data within a frame, and wherein each frame of interleaved data is provided to said modulation means for transmission simultaneously across said plurality of sub-channels.

100. A transmitter as claimed in claim 99, wherein said blocks of said input data are bits.

101. A transmitter as claimed in claim 97, wherein said modulation means performs, for each said sub-channel, multi-level amplitude and/or phase modulation (mQAM).

102. A transmitter as claimed in claim 101, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).

103. A transmitter as claimed in claim 56, wherein the transmission signal processing means further comprises a frame assembler coupled to said means for interleaving, and wherein said frame assembler assembles the interleaved blocks of data into a frame having zero padding.

104. A transmitter as claimed in claim 103, wherein the transmission signal processing means further comprises a synchronisation header generator that provides a header to said frame assembler.

105. A transmitter as claimed in claim 99, wherein said transmission signal processing means arranges a plurality of frames as a packet.

106. A transmitter as claimed in claim 105, wherein said packet has a variable duration less than or equal to a time period over which a channel characteristic is essentially stationary.

107. A transmitter as claimed in claim 106, wherein a range over which said packet duration varies includes a duration of 100 microseconds.

108. A transmitter as claimed in claim 56, wherein said modulation means is a complex Fast Fourier Transform based modulator, executing an Inverse Fast Fourier Transform.

109. A transmitter as claimed in claim 108, further comprising a cyclic extender coupled to receive an FFT output frame resulting from said Inverse Fast Fourier Transform, wherein said cyclic extender produces a cyclic extension that is added to said FFT output frame.

110. A transmitter as claimed in claim 56, wherein said antenna means provides polarization diversity.

111. A transmitter as claimed in claim 56, wherein said means for interleaving interleaves a predetermined number of said blocks of said data within a frame, and wherein each frame of interleaved data is provided to said modulation means for transmission simultaneously across said plurality of sub-channels.

112. A transmitter as claimed in claim 111, wherein said blocks of said input data are bits.

113. A transmitter as claimed in claim 111, wherein said transmission signal processing means arranges a plurality of frames as a packet.

114. A transmitter as claimed in claim 113, wherein said packet has a variable duration less than or equal to a time period over which a transmission characteristic is essentially stationary.

115. A transmitter as claimed in claim 114, wherein a range over which said packet duration varies includes a duration of 100 microseconds.

116. A transmitter as claimed in claim 56, wherein:
said means to apply data reliability enhancement is a convolutional encoder;
said means for interleaving interleaves a predetermined number of said blocks of said data within a frame, and wherein each frame of interleaved data is provided to said modulation means for transmission simultaneously across said plurality of sub-channels, and said blocks of said input data are bits;

said modulation means performs, for each said sub-channel, multi-level amplitude and/or phase modulation (mQAM) being one of: multi-level amplitude phase shift keying (mASK), permutation modulation, binary phase shift keying (BPSK), multi-level phase shift keying (mPSK) and multi-level amplitude phase keying (mAPK), and said modulation means is a complex Fast Fourier Transform based modulator, executing an Inverse Fast Fourier Transform; and said transmission signal processing means arranges a plurality of frames as a packet, and said packet has a variable duration less than or equal to a time period over which a transmission characteristic is essentially stationary.

117. A method claimed in claim 68, wherein said step of applying data reliability enhancement includes convolutional encoding of said data.

118. A method as claimed in claim 117, wherein said convolutional encoding uses a rate ½ convolutional code.

119. A method as claimed in claim 117, wherein said step of interleaving blocks includes interleaving a predetermined number of said blocks within each of multiple frames using an interleaving means that is part of said transmission signal processing means; and wherein said modulating step includes using said modulating means to modulate each frame for simultaneous transmission across said plurality of sub-channels.

120. A method as claimed in claim 119, wherein said blocks of said input data are bits.

121. A method as claimed in claim 117, wherein as part of said modulating step, said modulation means performs, for each said sub-channel, multi-level amplitude and/or phase modulation (mQAM).

122. A method as claimed in claim 121, wherein said mQAM modulation is one of: multi-level amplitude phase shift keying (mASK), permutation modulation, binary phase shift keying (BPSK), multi-level phase shift keying (mPSK) and multi-level amplitude phase keying (mAPK).

123. A method as claimed in claim 68, further comprising a step of assembling the interleaved blocks into a frame having zero padding.

124. A method as claimed in claim 123, wherein said assembling step is performed by a frame assembler that is part of said transmission signal processing means, and wherein the method further comprises: providing a synchronization header to said frame assembler.

125. A method as claimed in claim 119, further comprising arranging a plurality of frames into a packet for transmission.

126. A method as claimed in claim 125, wherein said packet has a variable duration less than or equal to a time period over which a transmission characteristic is essentially stationary.

127. A method as claimed in claim 126, wherein a range over which said packet duration varies includes a duration of 100 microseconds.

128. A method as claimed in claim 68, wherein said step of modulating data executes an Inverse Fast Fourier Transform.

129. A method as claimed in claim 128, further comprising extending an output frame produced by said Inverse Fast Fourier Transform by using a cyclic extender to add a cyclic extension.

130. A method as claimed in claim 68, wherein said antenna means provides polarization diversity.

131. A method as claimed in claim 68, wherein said step of interleaving blocks includes interleaving a predetermined number of said blocks within each of multiple frames using an interleaving means that is part of said transmission signal processing means; and wherein said modulating step includes using said modulating means to modulate each frame for simultaneous transmission across said plurality of sub-channels.

132. A method as claimed in claim 131, wherein said blocks of said input data are bits.

133. A method as claimed in claim 131, further comprising arranging a plurality of frames into a packet for transmission.

134. A method as claimed in claim 133, wherein said packet has a variable duration less than or equal to a time period over which a transmission characteristic is essentially stationary.

135. A method as claimed in claim 134, wherein a range over which said packet duration varies includes a duration of 100 microseconds.

136. A method as claimed in claim 68, wherein said step of applying data reliability enhancement includes convolutional encoding of said data;

wherein said step of interleaving blocks includes interleaving a predetermined number of said blocks within each of multiple frames using an interleaving means that is part of said transmission signal processing means;

wherein said blocks of said input data are bits;

wherein said modulating step includes:
    executing and Inverse Fast Fourier Transform to modulate each frame for simultaneous transmission across said plurality of sub-channels; and
    using said modulation means to perform, for each said sub-channel, multi-level amplitude and/or phase modulation, said mQAM modulation being one of: multi-level amplitude phase shift keying (mASK), permutation modulation, binary phase shift keying (BPSK), multi-level phase shift keying (mPSK) and multi-level amplitude phase keying (mAPK); and wherein the method further comprises arranging a plurality of said frames into a packet for transmission, said packet having a variable duration less than or equal to a time period over which a transmission characteristic is essentially stationary.

137. A method as claimed in claim 136, said steps operating to transmit data wirelessly in a wireless local area network.

138. A transceiver as claimed in claim 96, wherein the transceiver operates to transmit and receive data wirelessly in a wireless local area network.

139. A transceiver as claimed in claim 73, wherein the transmission signal processing means further comprises a frame assembler coupled to said means for interleaving, and wherein said frame assembler assembles the interleaved blocks of data into a frame having zero padding.

140. A transceiver as claimed in claim 139, wherein the transmission signal processing means further comprises a synchronisation header generator that provides a header to said frame assembler.

141. A transceiver as claimed in claim 140, wherein said reception signal processing means comprises a synchronizing detection means that detects a header in received data.

142. A transceiver as claimed in claim 73, wherein said modulation means is a complex Fast Fourier Transform based modulator, executing an Inverse Fast Fourier Transform.

143. A transceiver as claimed in claimed 142, further comprising a cyclic extender coupled to receive an FFT output frame resulting from said Inverse Fast Fourier Transform, wherein said cyclic extender produces a cyclic extension that is added to said FFT output frame.

144. A transceiver as claimed in claim 143, wherein said reception signal processing means comprises:
   a FFT circuit demodulating received radio frequency signals into received data;
   a deinterleaving circuit deinterleaving said received data into a data stream; and
   a decoder circuit generating output data from said data stream to be provided to said output data channel.

145. A transmitter as claimed in claim 97, wherein the transmission signal processing means further comprises a frame assembler coupled to said means for interleaving, and wherein said frame assembler assembles the interleaved blocks of data into a frame having zero padding.

146. A transmitter as claimed in claim 145, wherein the transmission signal processing means further comprises a synchronisation header generator that provides a header to said frame assembler.

147. A transmitter as claimed in claim 97, wherein said modulation means is a complex Fast Fourier Transform based modulator, executing an Inverse Fast Fourier Transform.

148. A transmitter as claimed in claim 147, further comprising a cyclic extender coupled to receive an FFT output frame resulting from said Inverse Fast Fourier Transform, wherein said cyclic extender produces a cyclic extension that is added to said FFT output frame.

149. A method as claimed in claim 117, further comprising a step of assembling the interleaved blocks into a frame having zero padding.

150. A method as claimed in claim 149, wherein said assembling step is performed by a frame assembler that is part of said transmission signal processing means, and wherein the method further comprises: providing a synchronization header to said frame assembler.

151. A method as claimed in claim 117, wherein said step of modulating data executes an Inverse Fast Fourier Transform.

152. A method as claimed in claim 151, further comprising extending an output frame produced by said Inverse Fast Fourier Transform by using a cyclic extender to add a cyclic extension.

* * * * *

(12) EX PARTE REEXAMINATION CERTIFICATE (9117th)
United States Patent
O'Sullivan et al.

(10) Number: US 5,487,069 C2
(45) Certificate Issued: Jul. 3, 2012

(54) WIRELESS LAN

(75) Inventors: John D. O'Sullivan, Ermington (AU);
Graham R. Daniels, Willoughby (AU);
Terence M. P. Percival, Lane Cove
(AU); Diethelm I. Ostry, Petersham
(AU); John F. Deane, Eastwood (AU)

(73) Assignee: Commonwealth Scientific and Industrial Research Organization, Campbell Australian Capital Territory (AU)

Reexamination Request:
No. 90/011,331, Nov. 12, 2010

Reexamination Certificate for:
Patent No.: 5,487,069
Issued: Jan. 23, 1996
Appl. No.: 08/157,375
Filed: Nov. 23, 1993

Reexamination Certificate C1 5,487,069 issued Mar. 15, 2011

(51) Int. Cl.
*H04W 4/00* (2006.01)
*H04L 12/28* (2006.01)
*H04L 12/56* (2006.01)
*H04L 27/10* (2006.01)

(52) U.S. Cl. .................. 370/404; 370/338; 375/284; 375/348; 455/506; 455/65

(58) Field of Classification Search .................. None
See application file for complete search history.

(56) References Cited

To view the complete listing of prior art documents cited during the proceeding for Reexamination Control Number 90/011,331, please refer to the USPTO's public Patent Application Information Retrieval (PAIR) system under the Display References tab.

*Primary Examiner* — Robert Nasser

(57) ABSTRACT

The present invention discloses a wireless LAN, a peer-to-peer wireless LAN, a wireless transceiver and a method of transmitting data, all of which are capable of operating at frequencies in excess of 10 GHz and in multipath transmission environments. This is achieved by a combination of techniques which enable adequate performance in the presence of multipath transmission paths where the reciprocal of the information bit rate of the transmission is short relative to the time delay differences between significant ones of the multipath transmission paths. In the LANs the mobile transceivers are each connected to, and powered by, a corresponding portable electronic device with computational ability.

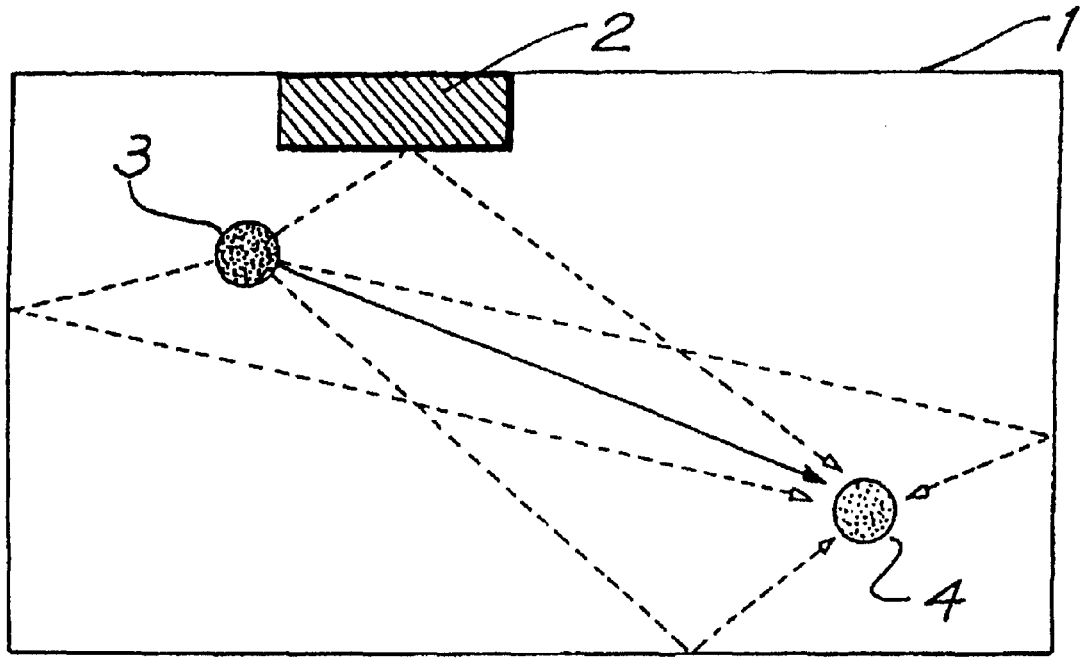

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4-16, 20-32, 36-48, 52-60, 73-116 and 138-152 is confirmed.

Claims 1-3, 17-19, 33-35, 49-51 and 61-63 were previously cancelled.

Claims 64 and 68 are determined to be patentable as amended.

Claims 65-67, 69-72 and 117-137, dependent of an amended claim, are determined to be patentable.

New claims 153-158 are added and determined to be patentable.

64. A method for transmitting data in a confined multipath transmission environment at radio frequencies in excess of 10 GHz, said data being provided by an input data channel coupled to transmission signal processing means in turn coupled to antenna means, said method comprising the steps of:
  modulating said data, by modulation means of said transmission signal processing means, into a plurality of sub-channels comprised of a sequence of data symbols such that the period of a sub-channel symbol is longer than a predetermined period representative of the time delay of significant ones of non-direct transmission paths; and
  transmitting, by said antenna means, said sub-channel symbols at said radio frequencies in excess of 10 GHz, providing data reliability enhancement to said data in advance of said modulation step wherein said data reliability enhancement is Forward Error Correction and,
  interleaving, *by means for interleaving,* blocks of said input data between the steps of providing data reliability enhancement monitoring and step of modulation.

68. A method for transmitting data in a confined multipath transmission environment at radio frequencies, said data being provided by an input data channel coupled to transmission signal processing means in turn coupled to antenna means, said method comprising the steps of:
  applying data reliability enhancement to said data;
  interleaving, *by means for interleaving,* blocks of said enhanced data;
  modulating said data, by modulation means of said transmission signal processing means, into a plurality of sub-channels comprised of a sequence of data symbols such that the period of a sub-channel symbol is longer than a predetermined period representative of the time delay of significant ones of non-direct transmission paths; and
  transmitting, by said antenna means, said sub-channel symbols.

*153. A transceiver as claimed in claim 83, wherein a range over which said packet duration varies includes a duration of 100 microseconds.*

*154. A transceiver as claimed in claim 93, wherein a range over which said packet duration varies includes a duration of 100 microseconds.*

*155. A transmitter as claimed in claim 105, wherein a range over which said packet duration varies includes a duration of 100 microseconds.*

*156. A transmitter as claimed in claim 113, wherein a range over which said packet duration varies includes a duration of 100 microseconds.*

*157. A method as claimed in claim 125, wherein a range over which said packet duration varies includes a duration of 100 microseconds.*

*158. A method as claimed in claim 133, wherein a range over which said packet duration varies includes a duration of 100 microseconds.*

\* \* \* \* \*